United States Patent
Baker et al.

(10) Patent No.: US 12,253,184 B2
(45) Date of Patent: Mar. 18, 2025

(54) FAILSAFE ACTUATED VALVE

(71) Applicant: EATON INTELLIGENT POWER LIMITED, Dublin (IE)

(72) Inventors: Graham Peter Baker, Issaquah, WA (US); Parag More, Maharashtra (IN); Daniel Peck, Southampton (GB); Abhijit Shrikrishna Borawake, Maharashtra (IN); Jason Robert Miner, Villa Park, CA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 17/847,815

(22) Filed: Jun. 23, 2022

(65) Prior Publication Data
US 2022/0412479 A1    Dec. 29, 2022

(30) Foreign Application Priority Data
Jun. 23, 2021 (IN) .............................. 202111028232

(51) Int. Cl.
F16K 31/04    (2006.01)
F16K 17/36    (2006.01)

(52) U.S. Cl.
CPC .......... *F16K 31/042* (2013.01); *F16K 17/366* (2013.01)

(58) Field of Classification Search
CPC .............................. F16K 31/042; F16K 17/366
See application file for complete search history.

(56) References Cited

U.S. PATENT DOCUMENTS

| | | | | |
|---|---|---|---|---|
| 3,258,985 A | * | 7/1966 | Jordan | F16K 31/047 74/388 R |
| 3,430,916 A | * | 3/1969 | Raymond, Jr. | F16K 31/043 251/71 |
| 3,808,895 A | | 5/1974 | Fitzwater | |
| 4,090,589 A | | 5/1978 | Fitzwater | |
| 5,131,623 A | * | 7/1992 | Giordani | F16K 31/045 251/129.11 |
| 5,518,462 A | * | 5/1996 | Yach | F16K 31/047 475/343 |
| 5,540,414 A | * | 7/1996 | Giordani | F16K 31/045 251/174 |
| 7,604,216 B2 | * | 10/2009 | Gebler | F16K 5/0652 251/293 |
| 8,973,451 B2 | * | 3/2015 | Oswald | F16K 31/047 251/71 |
| 2004/0113110 A1 | | 6/2004 | Silva et al. | |
| 2010/0308240 A1 | * | 12/2010 | McAdoo | F16K 31/047 251/129.01 |

FOREIGN PATENT DOCUMENTS

GB          2572735 A        10/2019

OTHER PUBLICATIONS

Extended European Search for EP 22180806.6, mailed Nov. 21, 2022.

* cited by examiner

*Primary Examiner* — Angelisa L. Hicks
(74) *Attorney, Agent, or Firm* — Merchant & Gould P.C.

(57) ABSTRACT

A failsafe valve system configured to bring the valve to a predefined state (e.g., fully opened, fully closed) if the actuator fails (e.g., loss of power). The failsafe system of the present disclosure is energy efficient and reliable.

11 Claims, 39 Drawing Sheets

FAILSAFE ACTUATED VALVE

CROSS-REFERENCE TO RELATED APPLICATION

This application claims the benefit of Indian Provisional Patent Application No. 202111028232, filed on Jun. 23, 2021, the disclosure of which is incorporated herein by reference in its entirety.

TECHNICAL FIELD

Actuated valves with failsafe functionality.

BACKGROUND

Valves are commonly actuated via an actuator. If the actuator fails during use, it can result in the valve being stuck in a partially open/partially closed position. In some applications, it is desirable for such valves to be driven to an open or closed position in such circumstances. For example, in refueling applications, valves are open to allow fuel to flow from a tanker to an aircraft. In the event the valve actuator fails (e.g., loss of power), it is desirable for the valve to close so that the refueling stops and the aircraft can detach from the tanker. It is also desirable to have a valve failsafe system that does not decrease the operational efficiency of the system.

SUMMARY

The present disclosure provides a failsafe valve system. The failsafe system is configured to bring the valve to a predefined state (e.g., fully opened, fully closed) if the actuator fails (e.g., loss of power). The failsafe system of the present disclosure is energy efficient and reliable.

BRIEF DESCRIPTION OF THE FIGURES

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION

Reference will now be made in detail to embodiments of the present disclosure, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
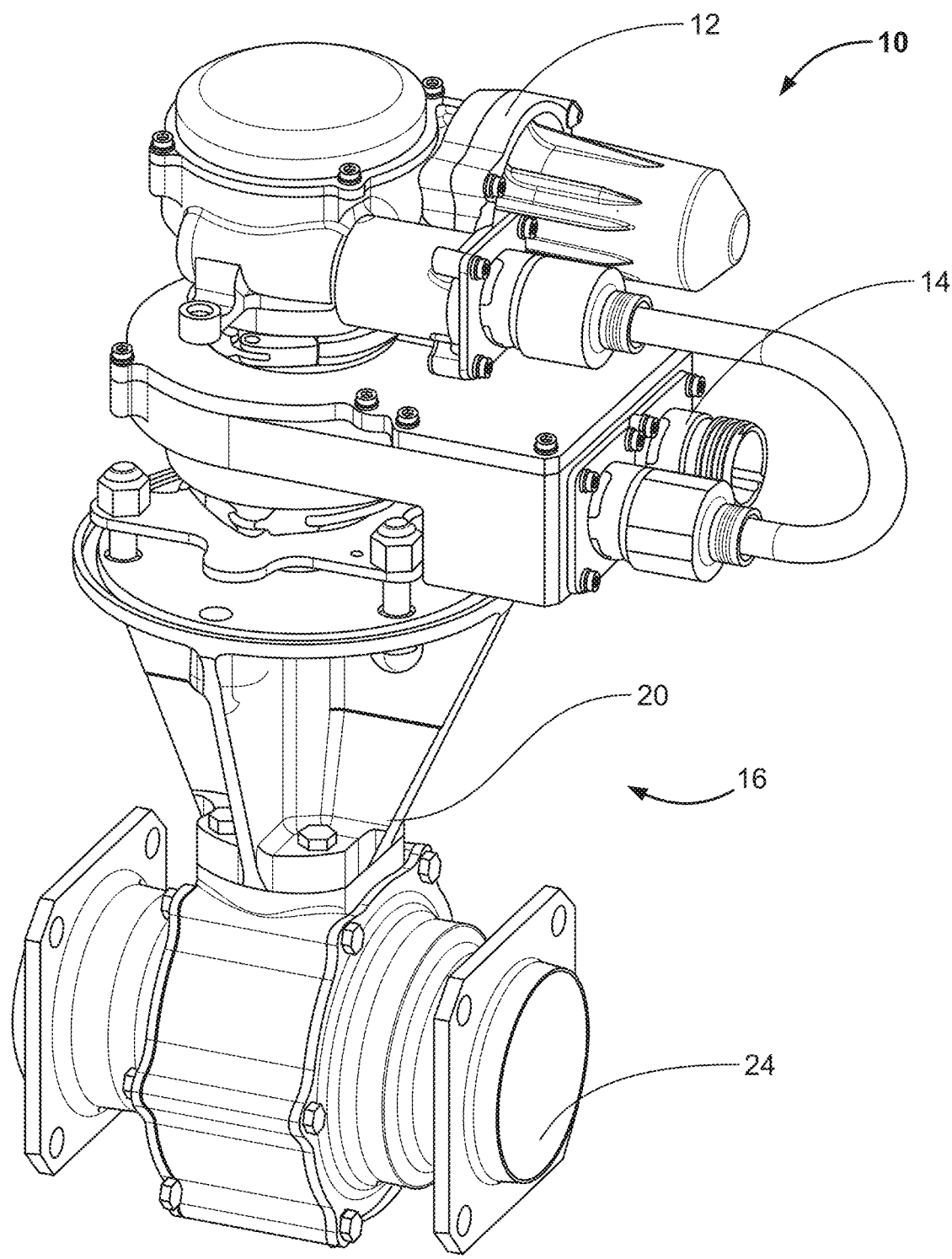
FIG. 1 is an isometric view of an embodiment of the failsafe valve system of the present disclosure.
Figure 2:
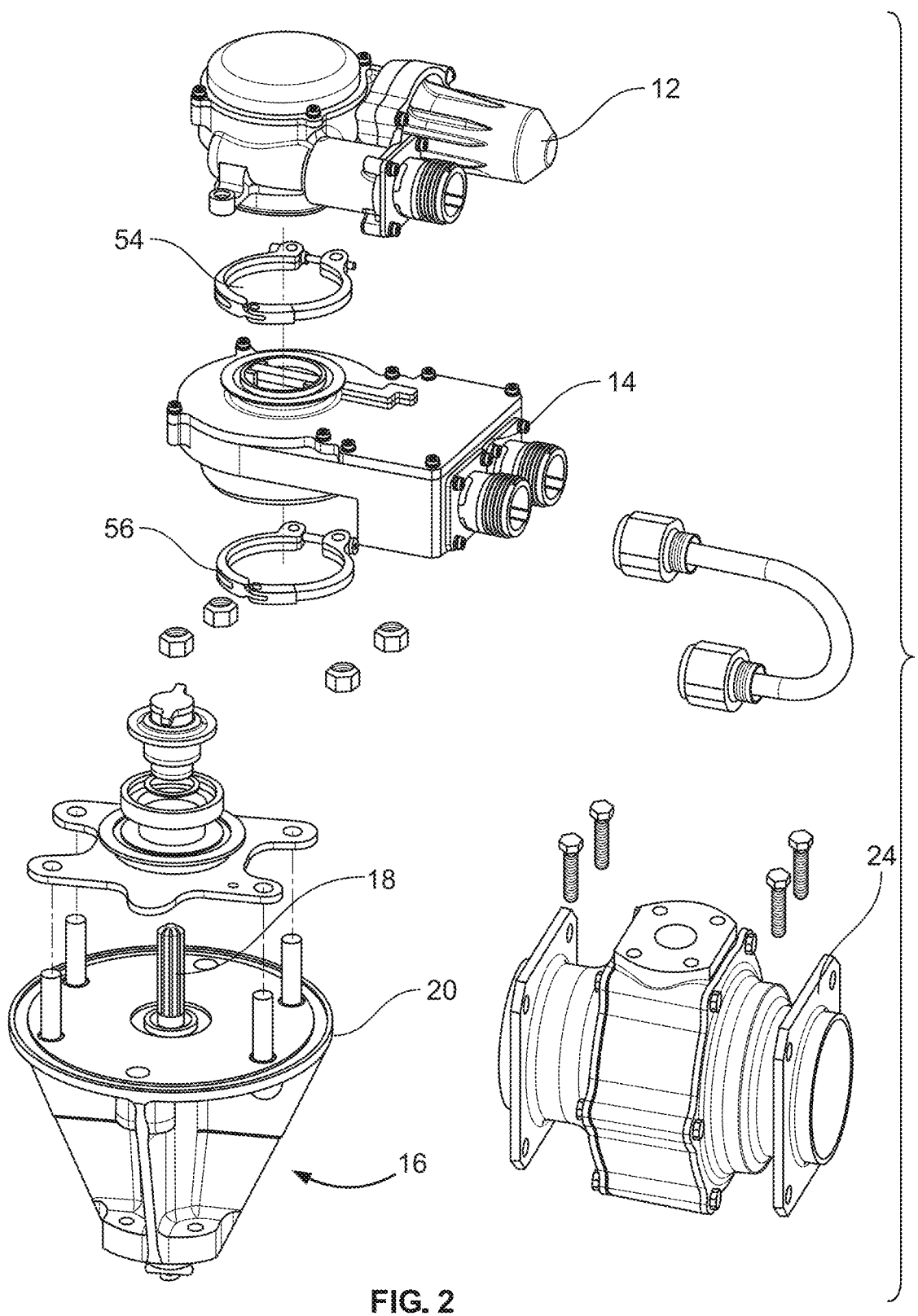
FIG. 2 is a partially exploded isometric view of the failsafe valve system of FIG. 1.
Figure 3:
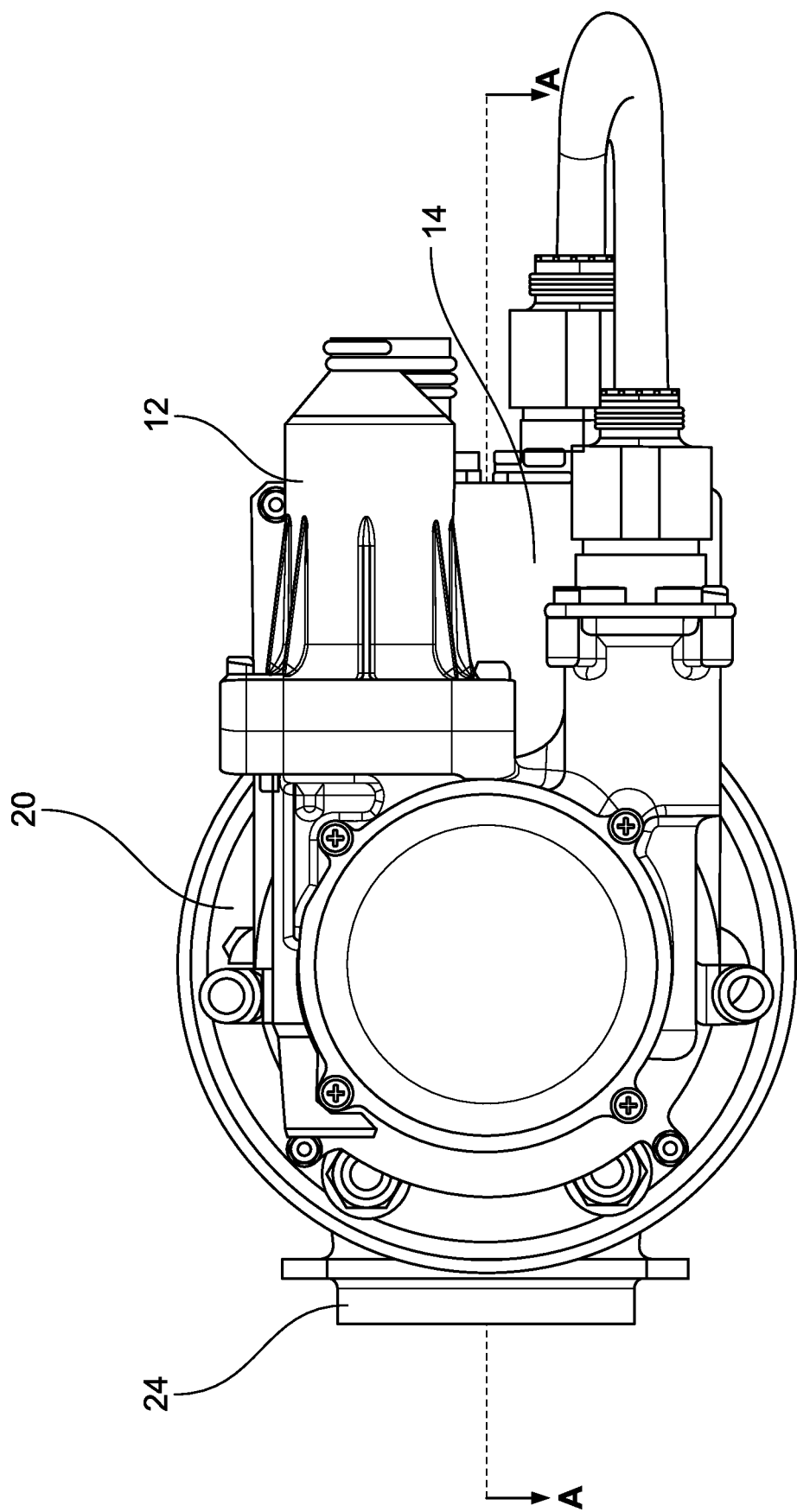
FIG. 3 is a top view of the failsafe valve system.

The present disclosure is described in further detail herein with reference to the figures. FIG. 1 depicts an embodiment of the present disclosure. In the depicted embodiment, the disclosed failsafe valve system 10 includes an actuator 12 that is mounted to a failsafe drive adapter 14, which is mounted to a pedestal ball valve 16.

In the depicted embodiment, the actuator 12 generates torque that drives the closing and opening of the pedestal ball valve 16. In the depicted embodiment, the actuator 12 includes a direct current permanent magnet motor. In the depicted embodiment, the actuator 12 has 90° travel position sensors that are used to control power to the motor and provide position indication. In the depicted embodiment, the actuator 12 includes a gearbox that contains spur, worm, and wheels, as well as an epicyclic gear chain and includes the capability to lock the output drive when unpowered. In the depicted embodiment, the actuator 12 construction is a cast aluminum body with a female dog drive that is configured to interface with the failsafe drive adapter 14. In the depicted embodiment, the actuator 12 also incorporates a plastic motor housing with conductive coating, an aerospace-standard electrical connector, and a provision for two bonding strap locations.

In the depicted embodiment, the failsafe drive adapter 14 interfaces between the actuator 12 and the pedestal ball valve 16. In the depicted embodiment, during normal operations, the failsafe drive adapter 14 transfers output torque of the actuator 12 to the pedestal ball valve 16 without any additional resistance. However, if and when power interruption occurs or the actuator 12 otherwise fails, the failsafe drives the valve 16 back to a default predetermined position. For example, the default predetermined position can be set as the zero degree position corresponding to a fully closed valve position. In the depicted embodiment, the failsafe drive adapter 14 is configured such that if the actuator 12 fails the failsafe checks if the valve 16 is in the predetermined default position, and if the valve 16 is not, the failsafe drives the valve 16 to the predetermined default position.

In the depicted embodiment, when power is resumed after the power interruption event, the failsafe drive adapter 14 checks if there is a mismatch between the actuator 12 and valve 16 positions, as the spring will only drive the valve 16 to the default position, but the actuator 12, due to its construction, will remain in the position where power interruption occurred. The existence of a mismatch indicates that the re-latching of the spring to store the energy for a future failsafe event is required. In order to perform the re-latch operation, the actuator 12 must be in the default position as the failsafe event had been triggered based on conditions. A command will be given to the actuator 12 to move to the default position. The actuator 12 in this condition is not connected to the valve drive or the failsafe drive and the solenoid remains powered off. If there is no mismatch in the actuator 12 position and the valve 16 position after a power resumption event, the spring is in the stored energy position, and the re-latching function will not occur.

If it is determined by the failsafe controller that a re-latching operation is required to be executed, after reaching the default position with some delay, the actuator 12 will be triggered to move to a closed position which is the stored energy position for the spring. Arrangement in the failsafe drive shall be such that during this movement of the actuator 12 from the default open to closed position, the actuator 12 shall mechanically connect with the failsafe drive and drive it to a closed position, torqueing the torsional spring 38 and storing the required energy for future failsafe events.

In the depicted embodiment, when the failsafe re-latching function is triggered, and when the failsafe drive reaches the closed position, the actuator 12 with some delay will be commanded to return to the open position. In the depicted embodiment, once the actuator 12 reaches the open position after re-latching is performed and the torsional spring 38 is in the stored energy position, the solenoid is powered on to connect the valve drive to the actuator 12 to operate the valve 16 and the actuator 12 as normal.

Figure 4:
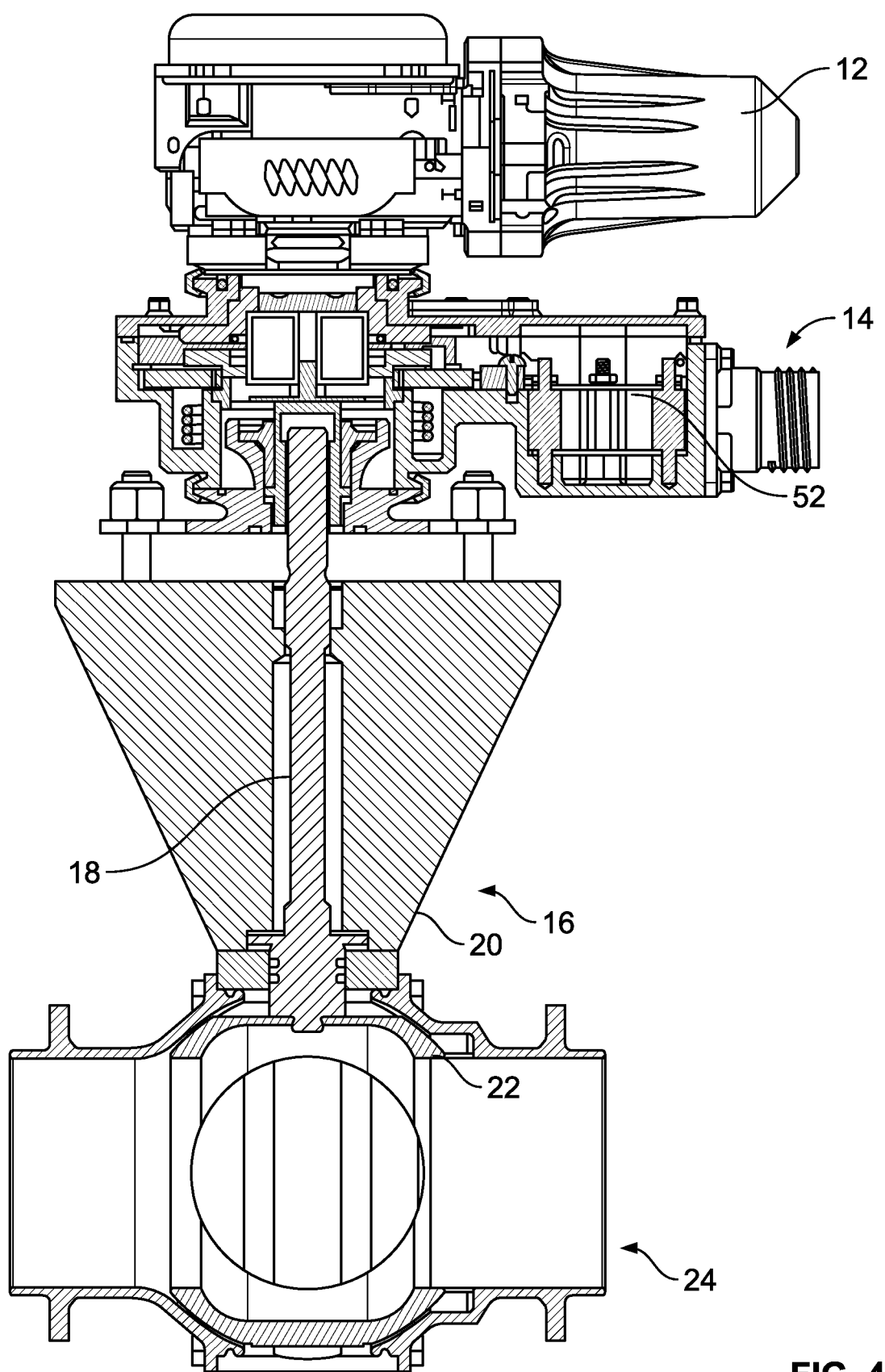
FIG. 4 is a cross-sectional view of the failsafe valve system along line A-A of FIG. 3 in a first state.

Referring to FIG. 4, the pedestal ball valve 16 is described in greater detail. In the depicted embodiment, the pedestal ball valve 16 is actuated electrically via the actuator 12 that rotates an input shaft 18 that extends through the pedestal housing 20. Rotation of the input shaft 18 drives the rotation of a spherical plug 22 seated in a valve housing 24. In the depicted embodiment, rotation of the spherical plug 22 through 90 degrees controls the flow rate of fluid through the pedestal ball valve 16 from being completely open to completely closed and every position of partial flow in between.

Figure 5:
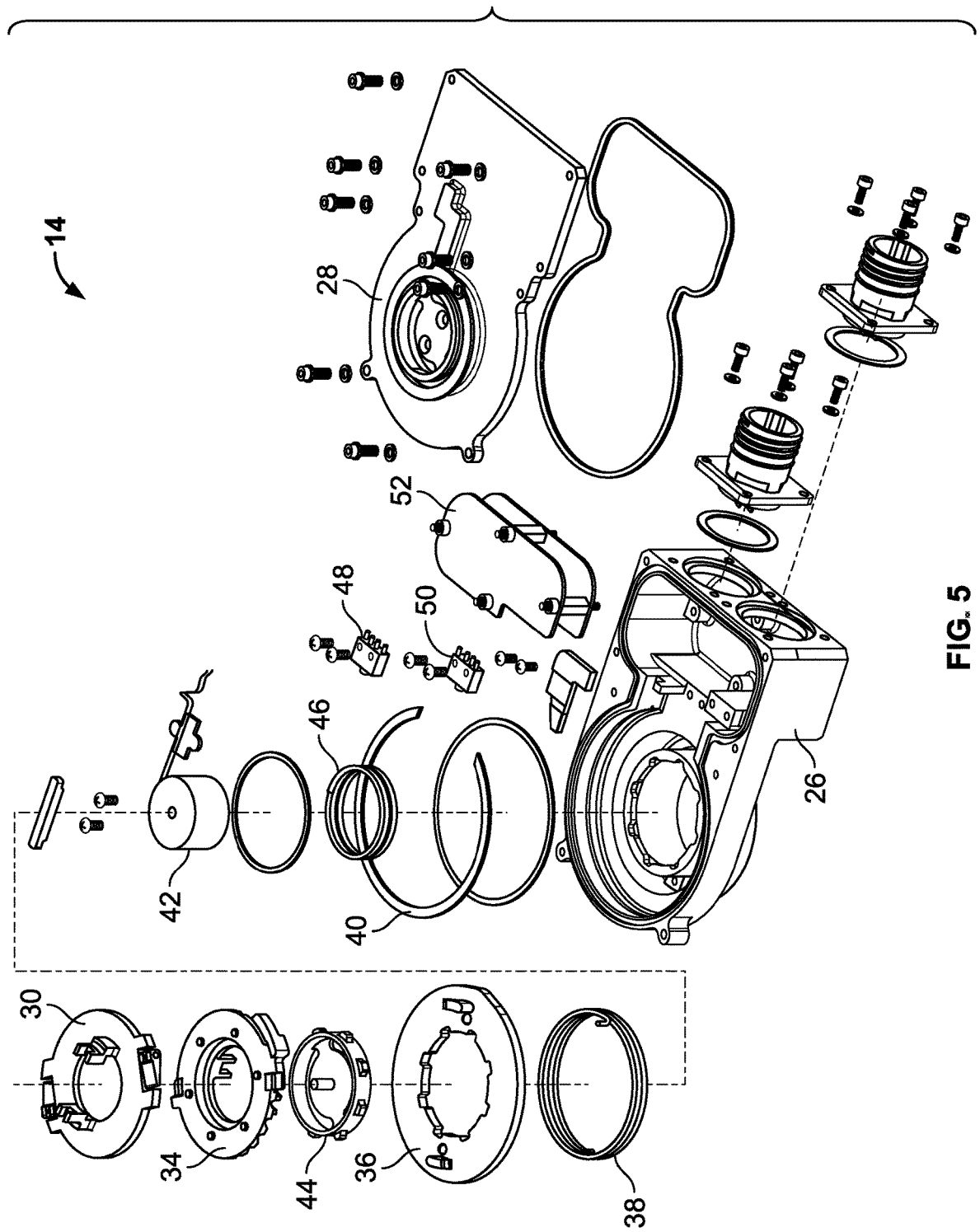
FIG. 5 is a partially exploded isometric view of a component of the failsafe valve system of FIG. 1.
Figure 6:
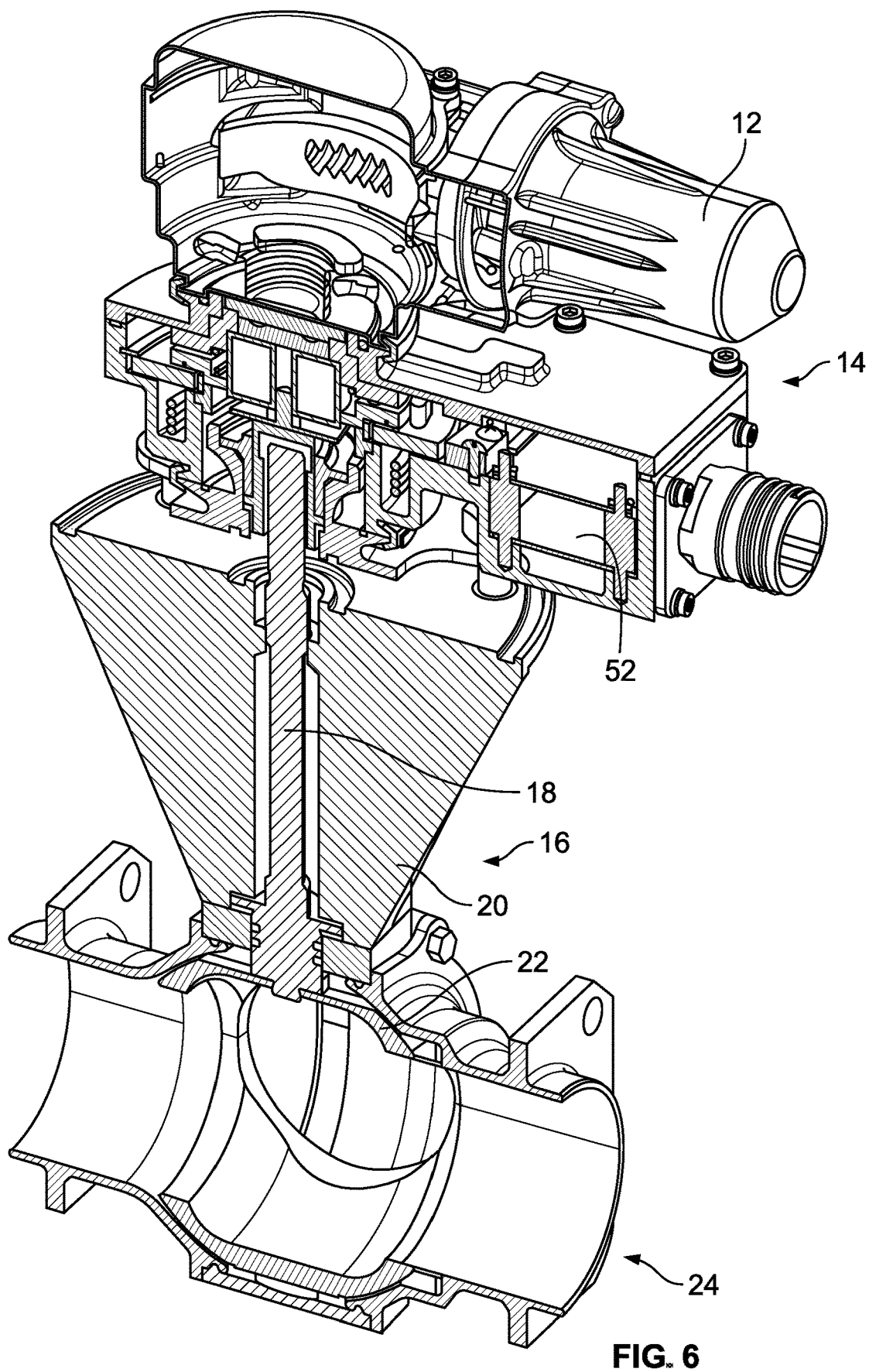
FIG. 6 is an isometric cross-sectional view of the failsafe valve system along line A-A of FIG. 4 in a first state.
Figure 7:
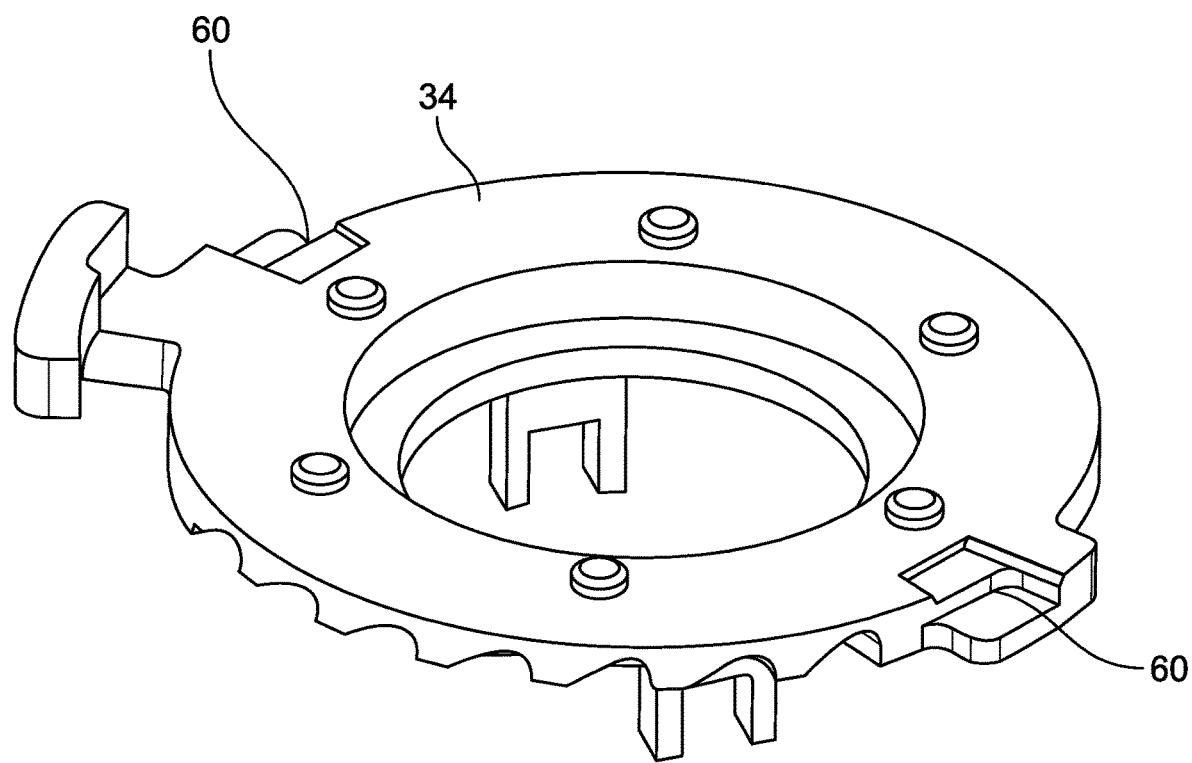
FIG. 7 is a top isometric view of a component of the failsafe valve system of FIG. 1.
Figure 8:
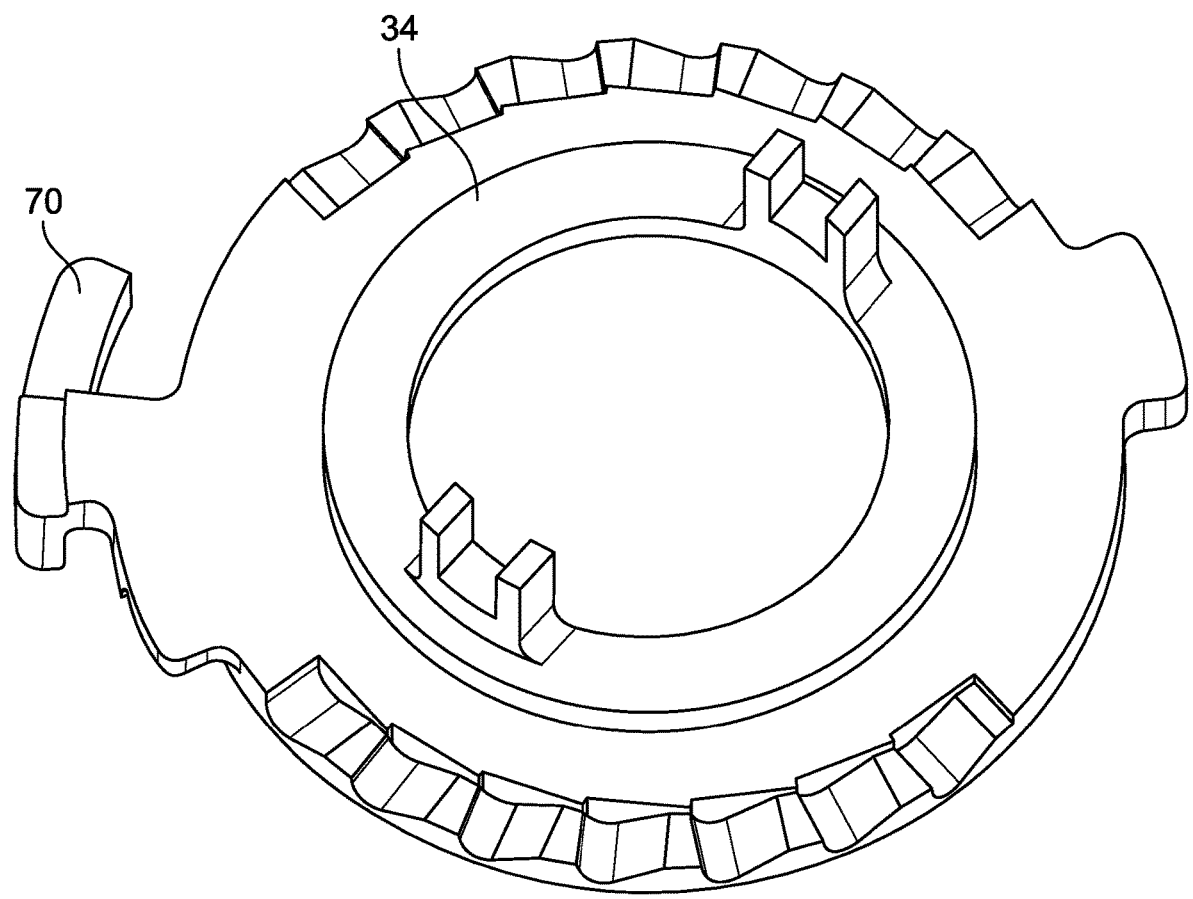
FIG. 8 is a bottom isometric view of the component of FIG. 7.
Figure 9:
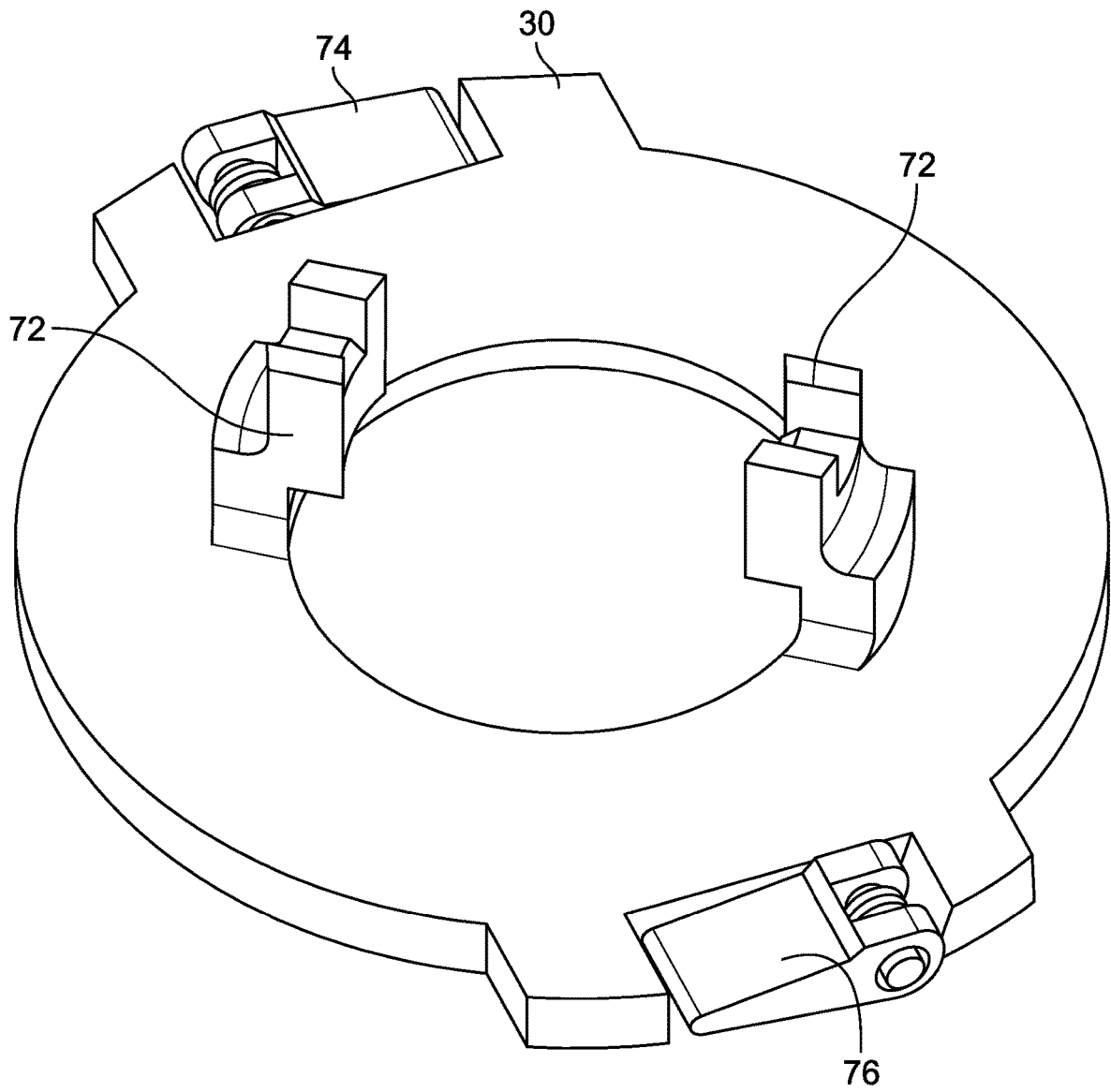
FIG. 9 is a top isometric view of a component of the failsafe valve system of FIG. 1.
Figure 10:
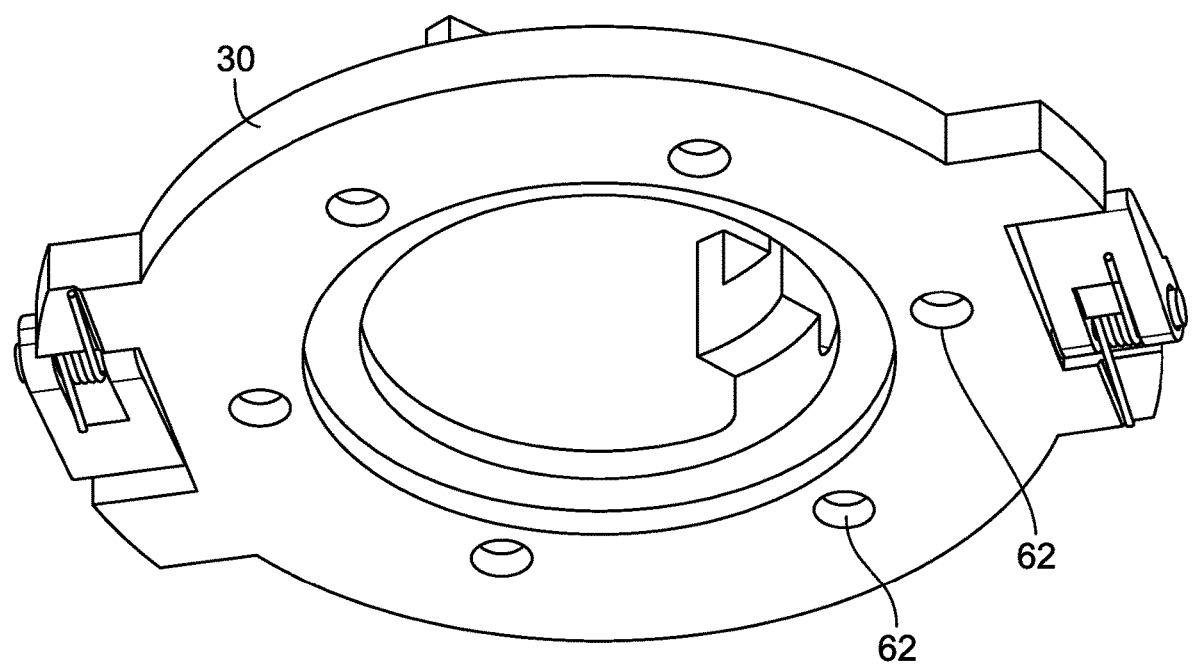
FIG. 10 is a bottom isometric view of the component of FIG. 9.
Figure 11:
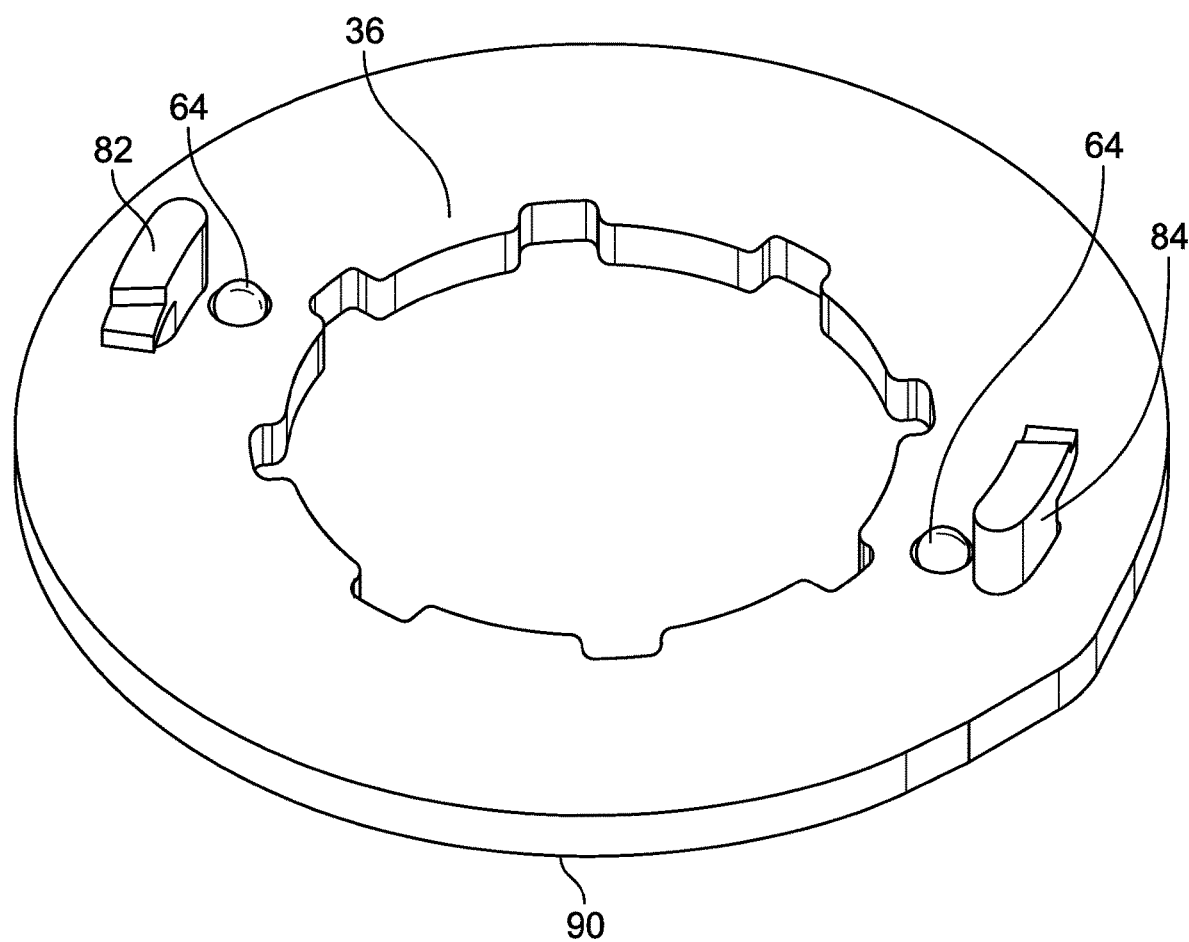
FIG. 11 is a top isometric view of a component of the failsafe valve system of FIG. 1.
Figure 12:
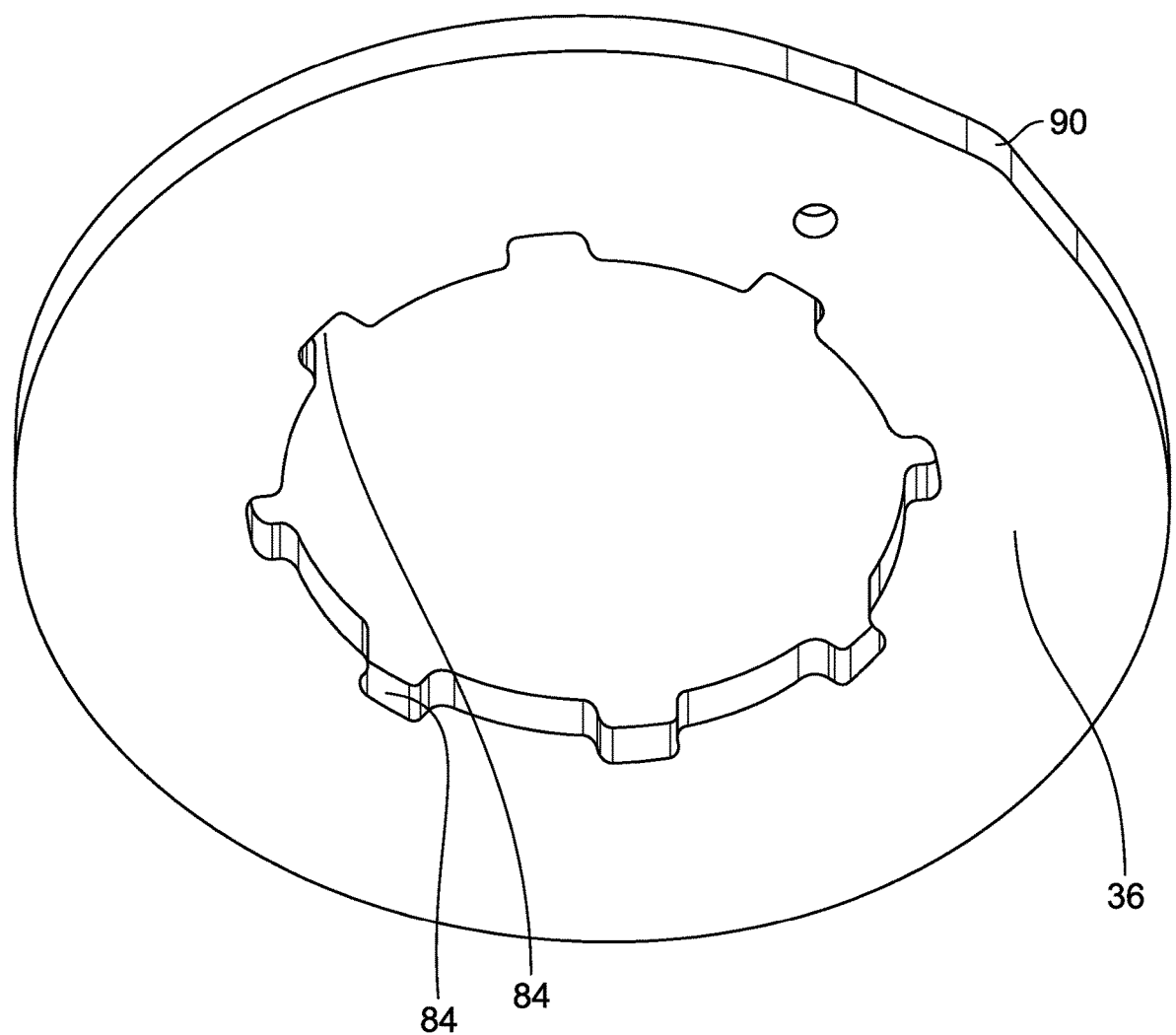
FIG. 12 is a bottom isometric view of the component of FIG. 11.
Figure 13:
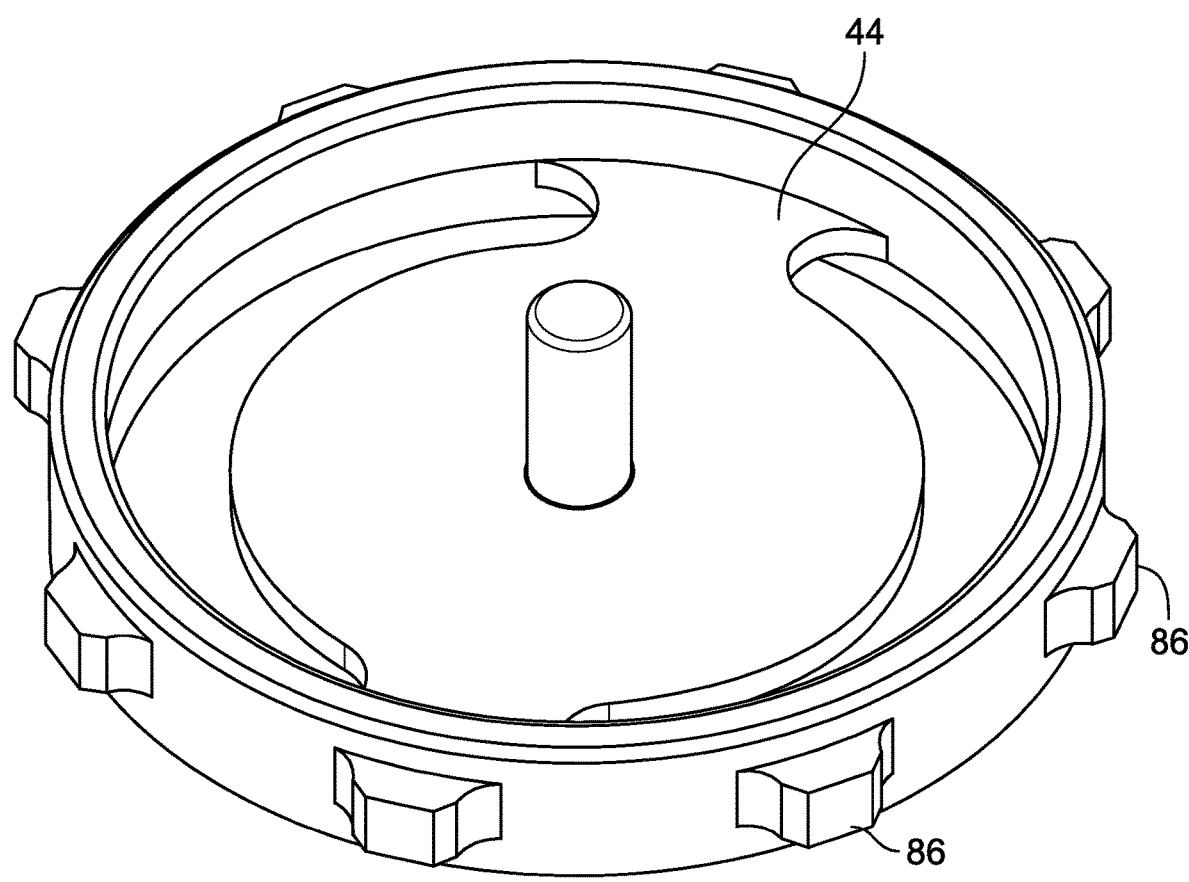
FIG. 13 is a top isometric view of a component of the failsafe valve system of FIG. 1.
Figure 14:
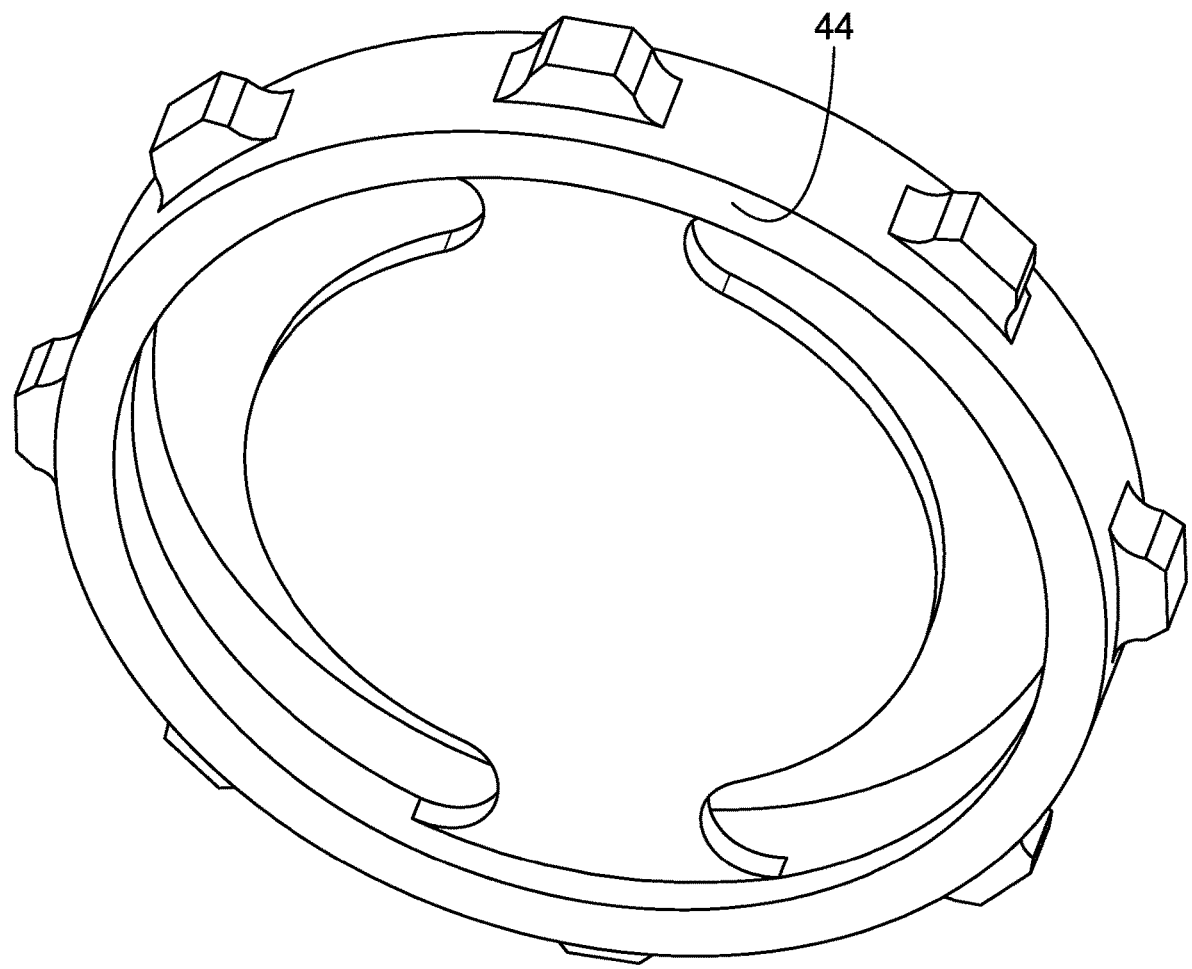
FIG. 14 is a bottom isometric view of the component of FIG. 13.
Figure 15:
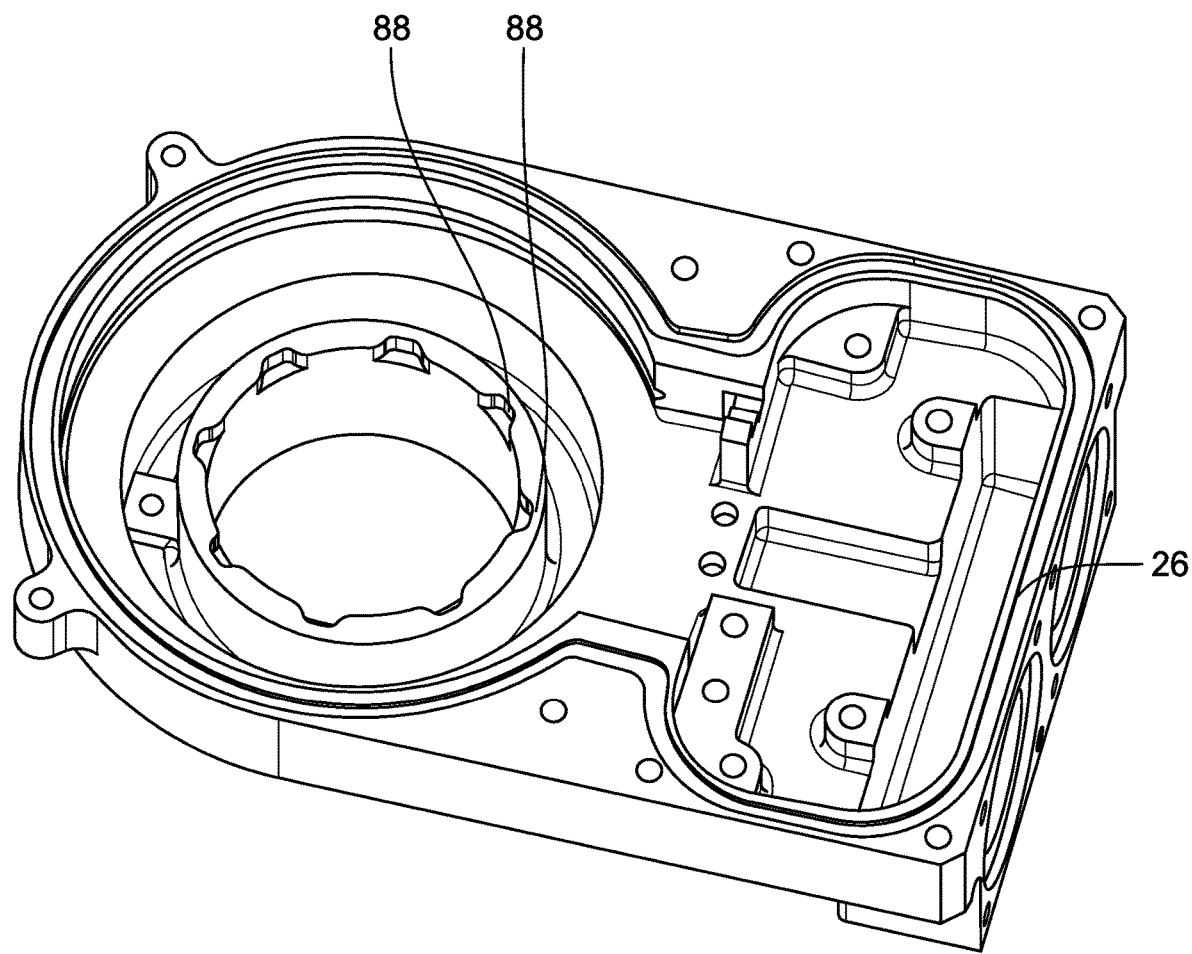
FIG. 15 is top isometric view of a component of the failsafe valve system of FIG. 1.
Figure 16:
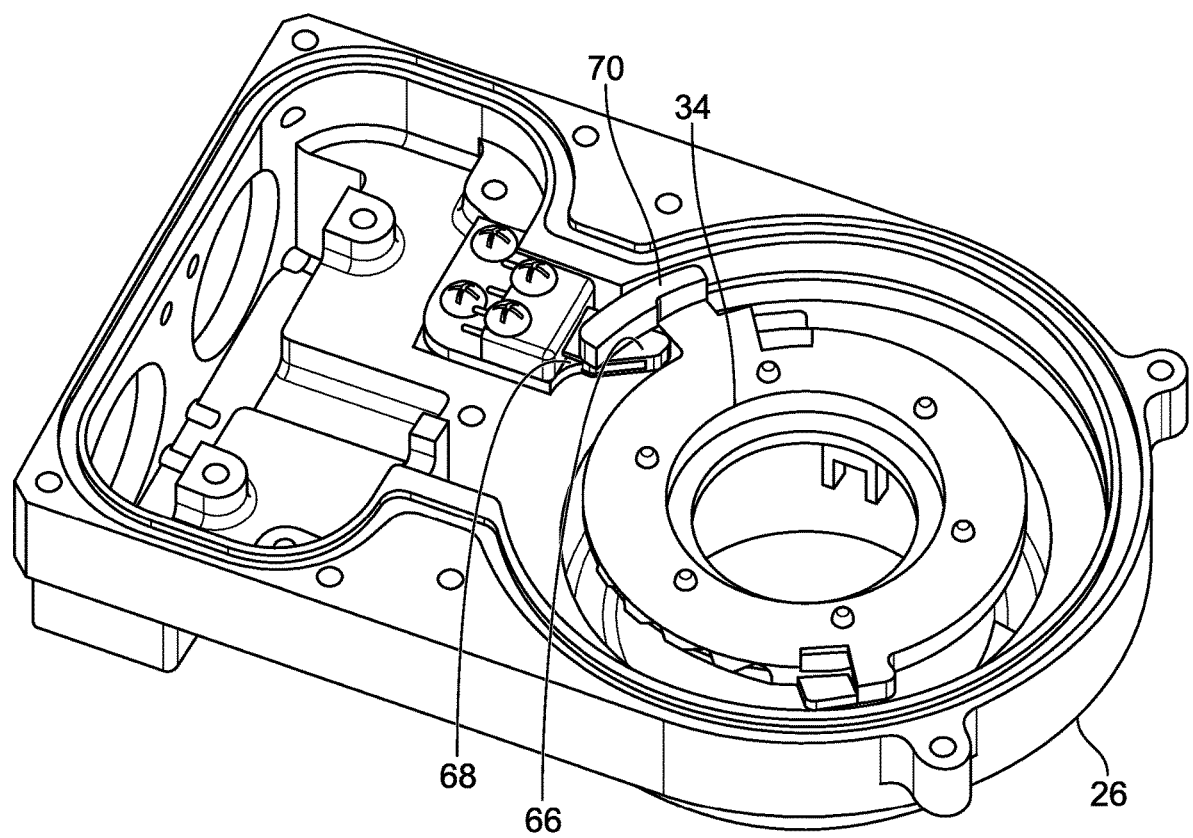
FIG. 16 is top isometric view of a component of the failsafe valve system of FIG. 1.
Figure 17:
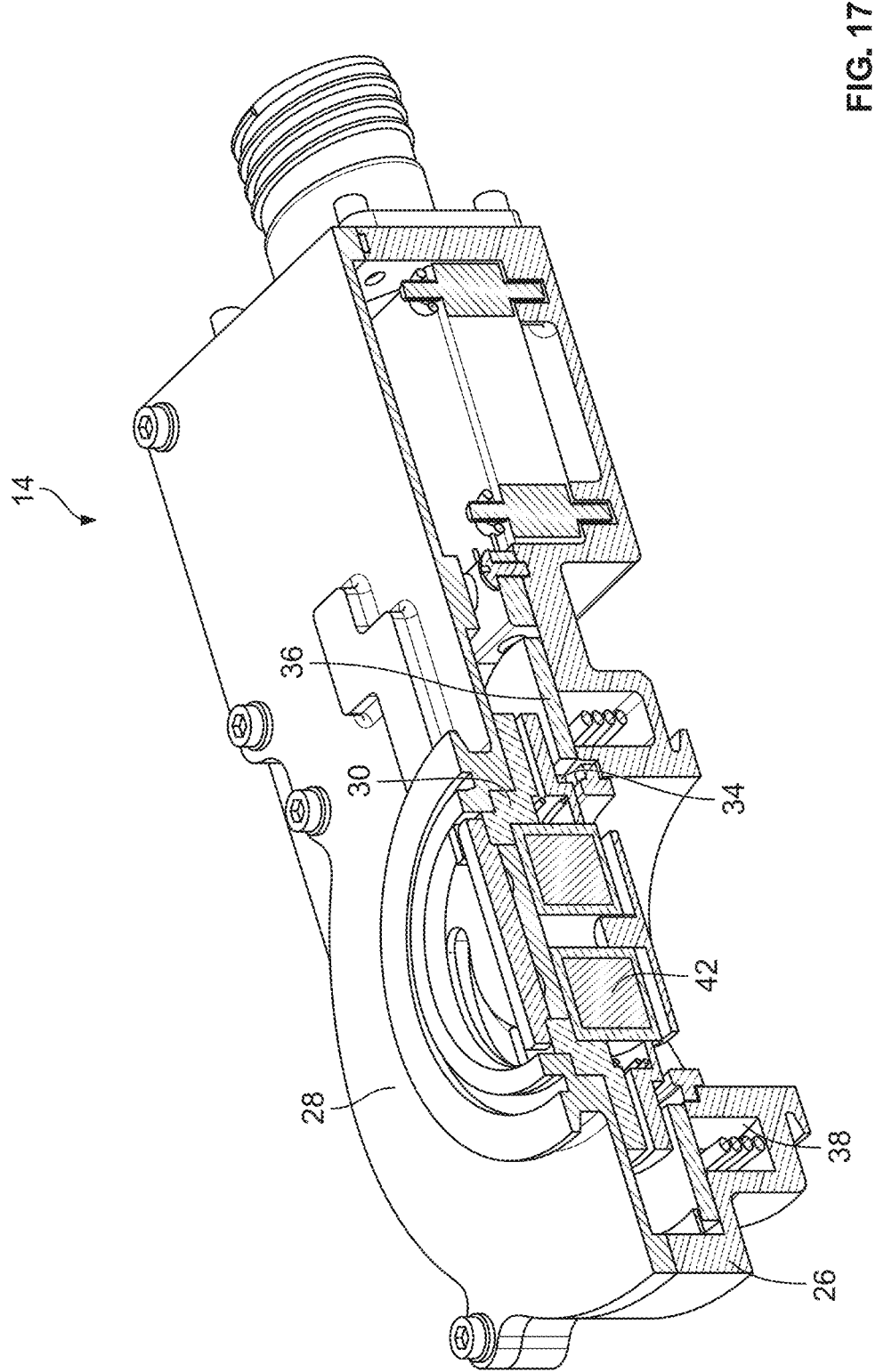
FIG. 17 is an isometric cross-sectional view of a portion of FIG. 5.
Figure 18:
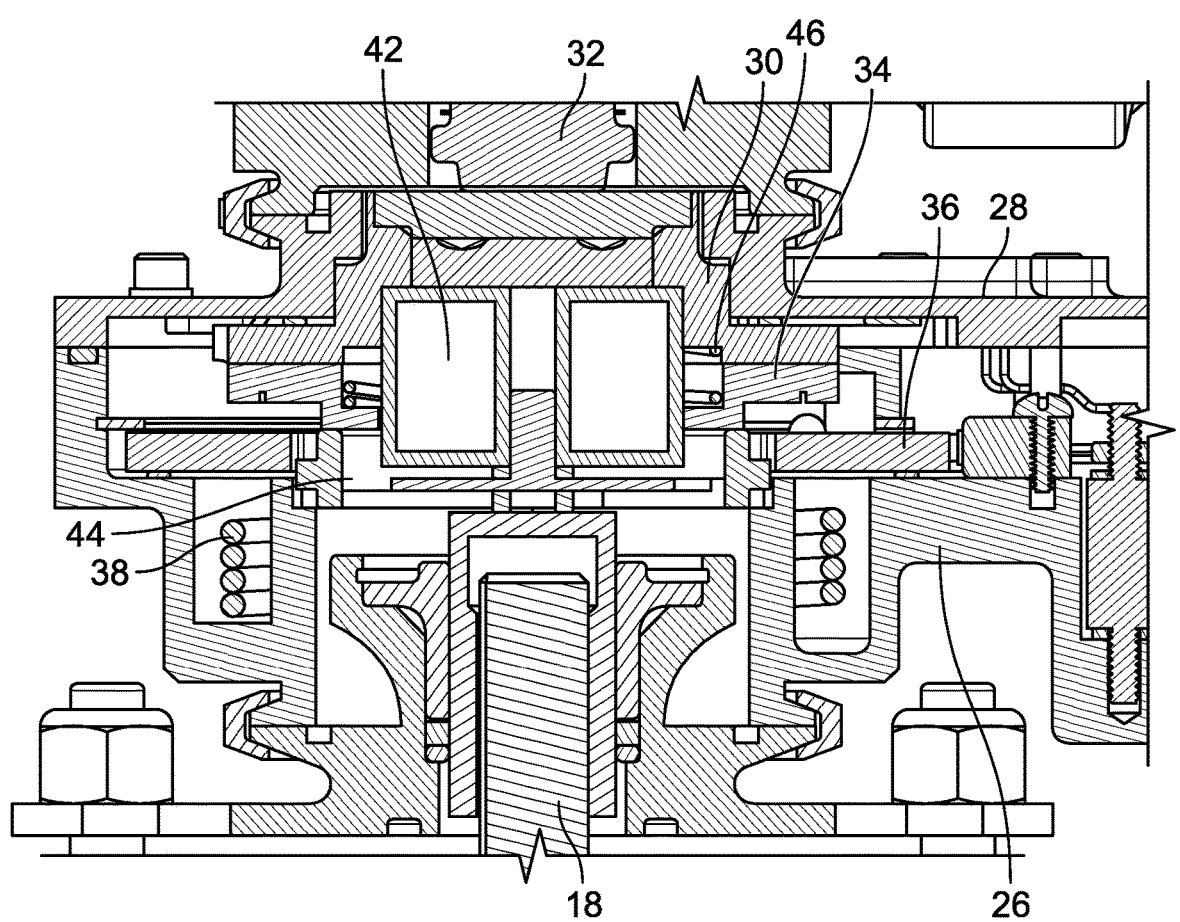
FIG. 18 is a cross-section view of the portion of FIG. 17.
Figure 19:
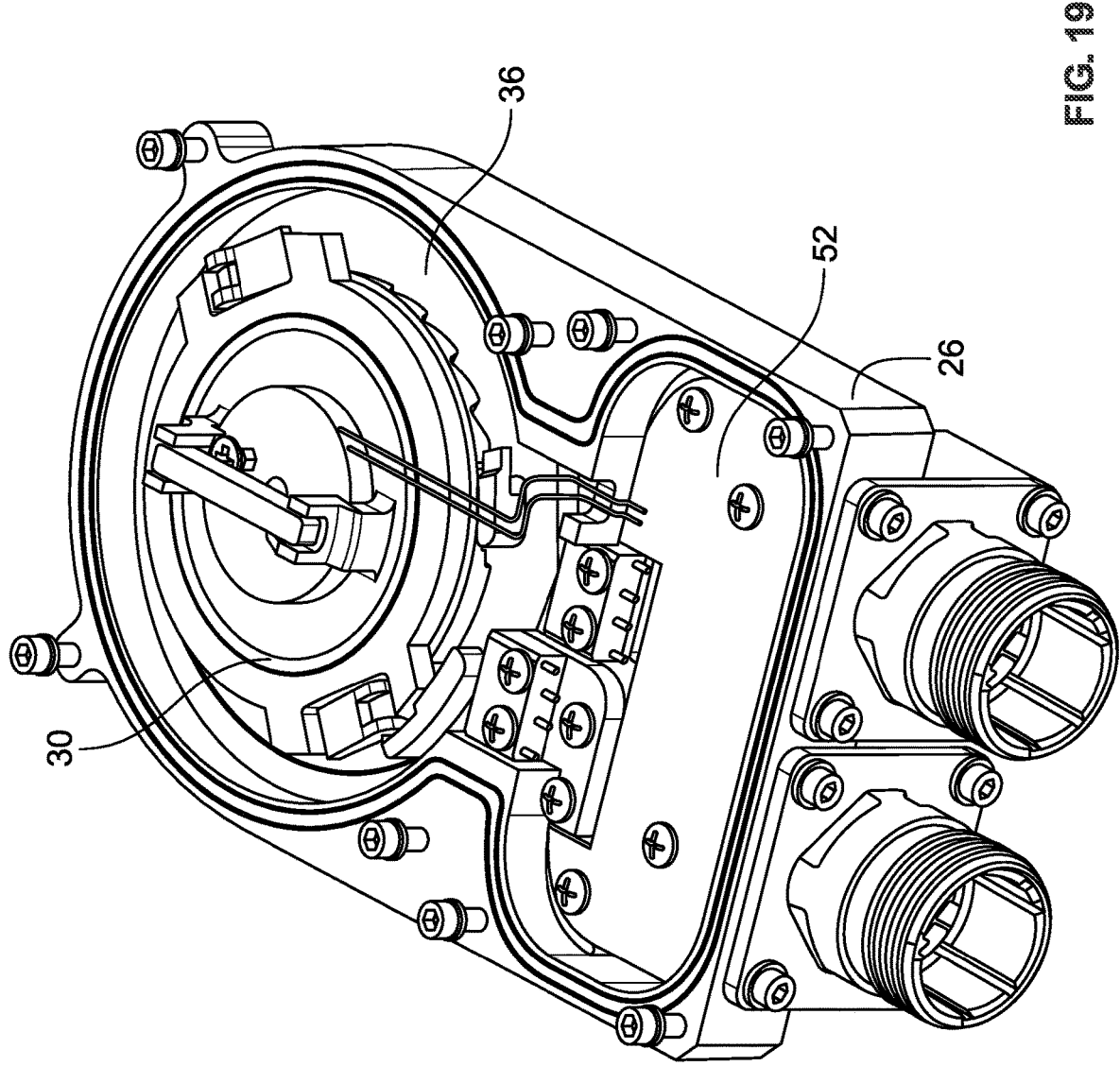
FIG. 19 is a top view of a portion of FIG. 5 with certain parts removed.
Figure 20:
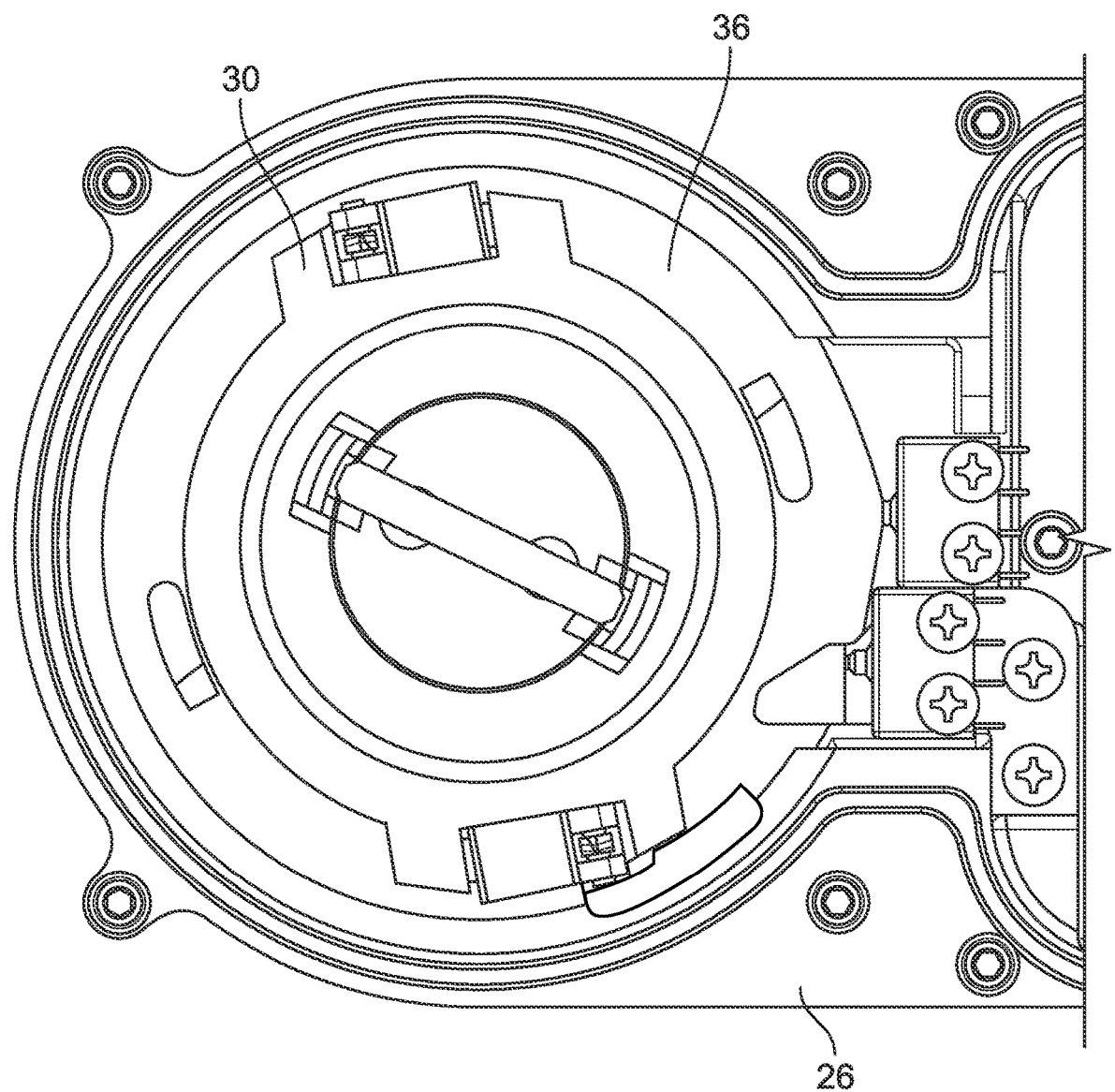
FIG. 20 is a view of the portion of FIG. 7 in a different state.
Figure 21:
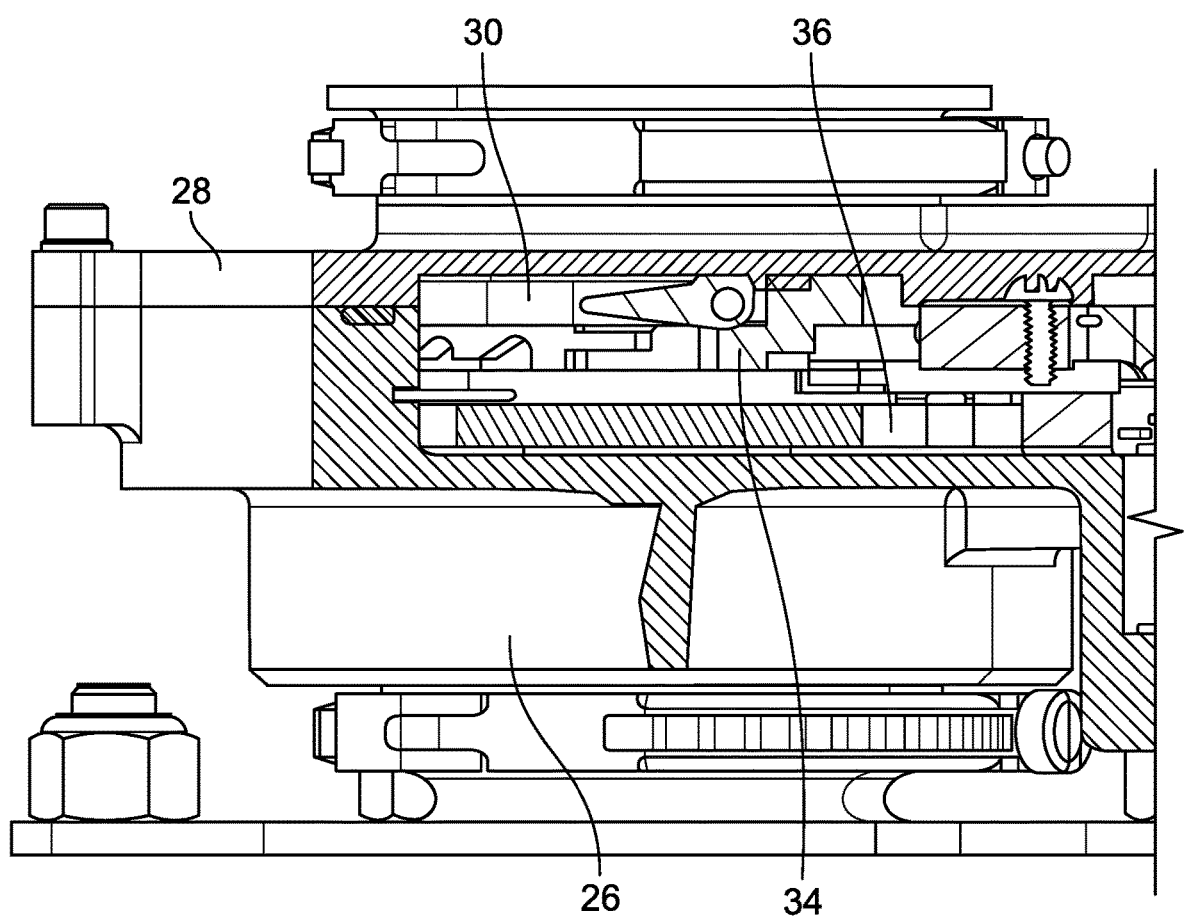
FIG. 21 is a first partial cross-sectional view of a portion of the failsafe valve system of FIG. 1.
Figure 22:
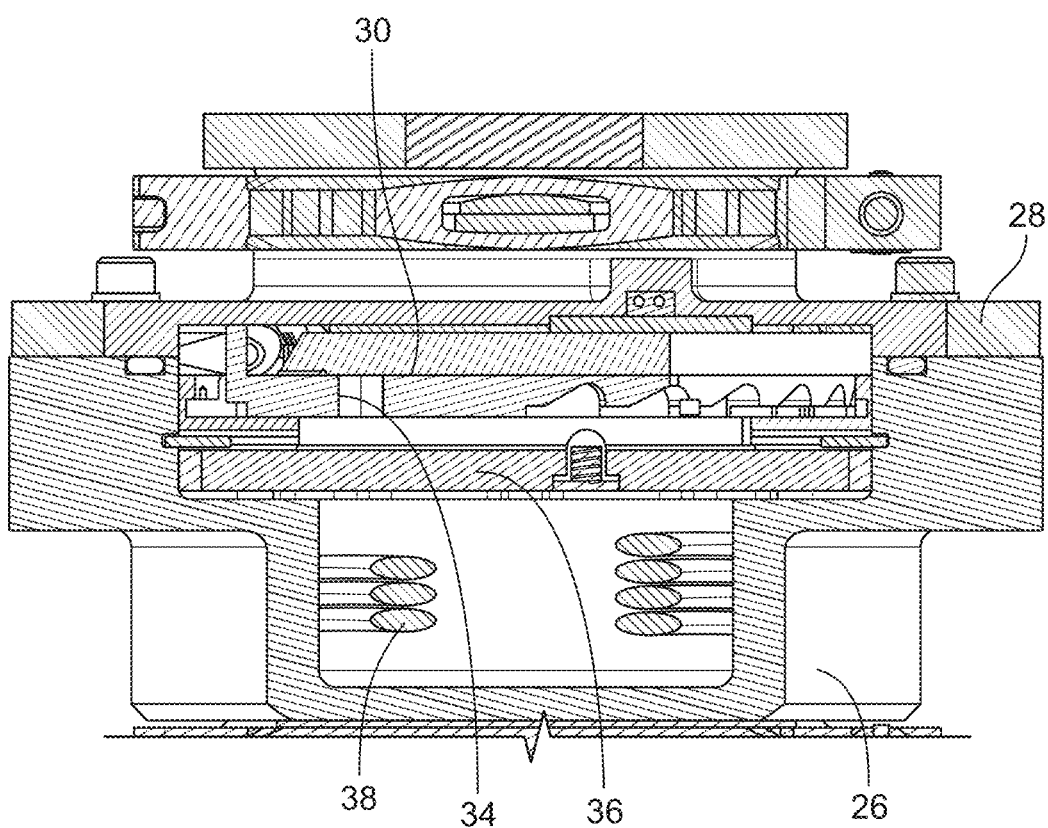
FIG. 22 is a second partial cross-sectional view of a portion of the failsafe valve system of FIG. 1.
Figure 23:
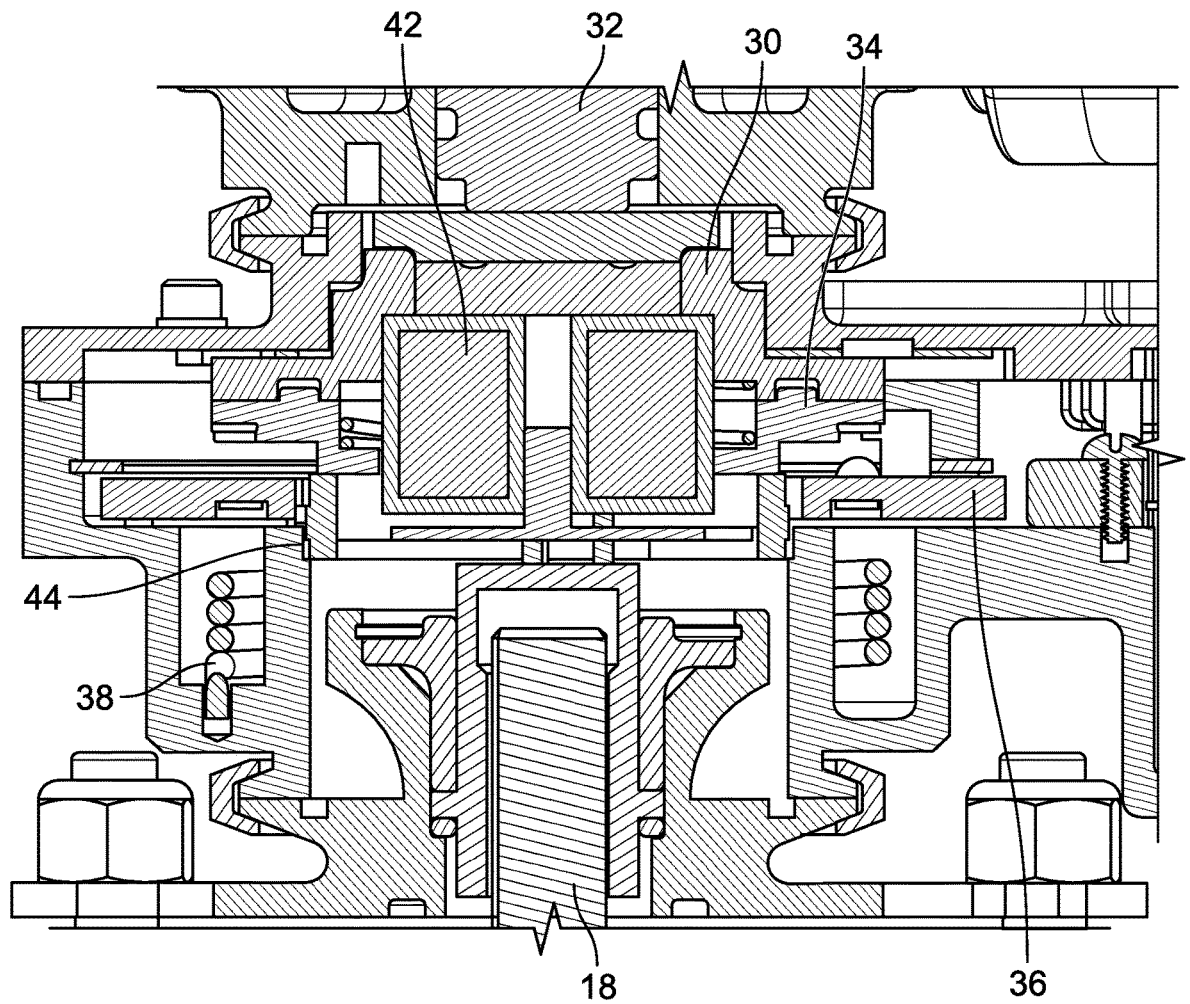
FIG. 23 is a cross-sectional view of a portion of the failsafe valve system.
Figure 24:
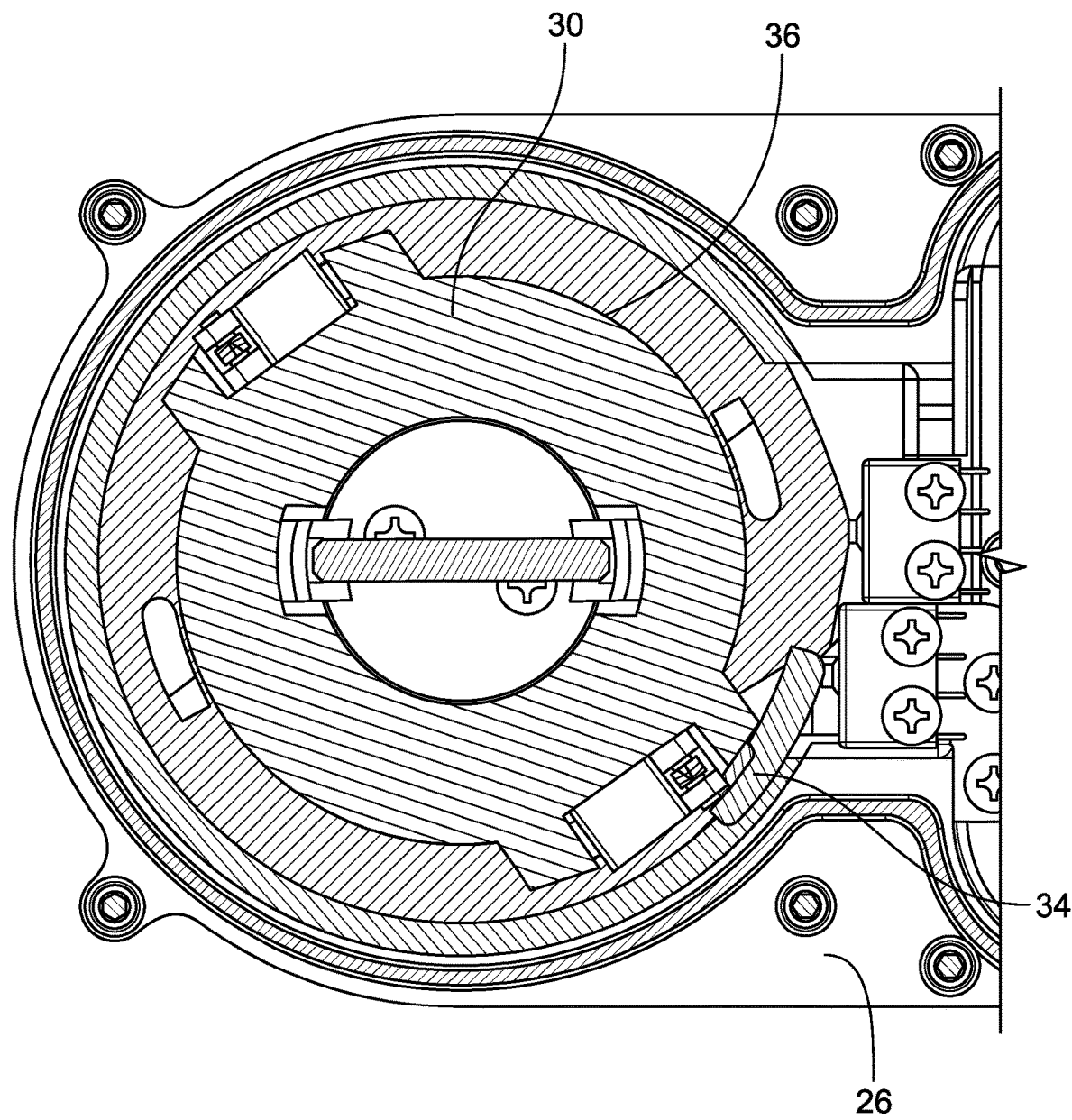
FIG. 24 is a top view of the failsafe valve system with certain parts removed.
Figure 25:
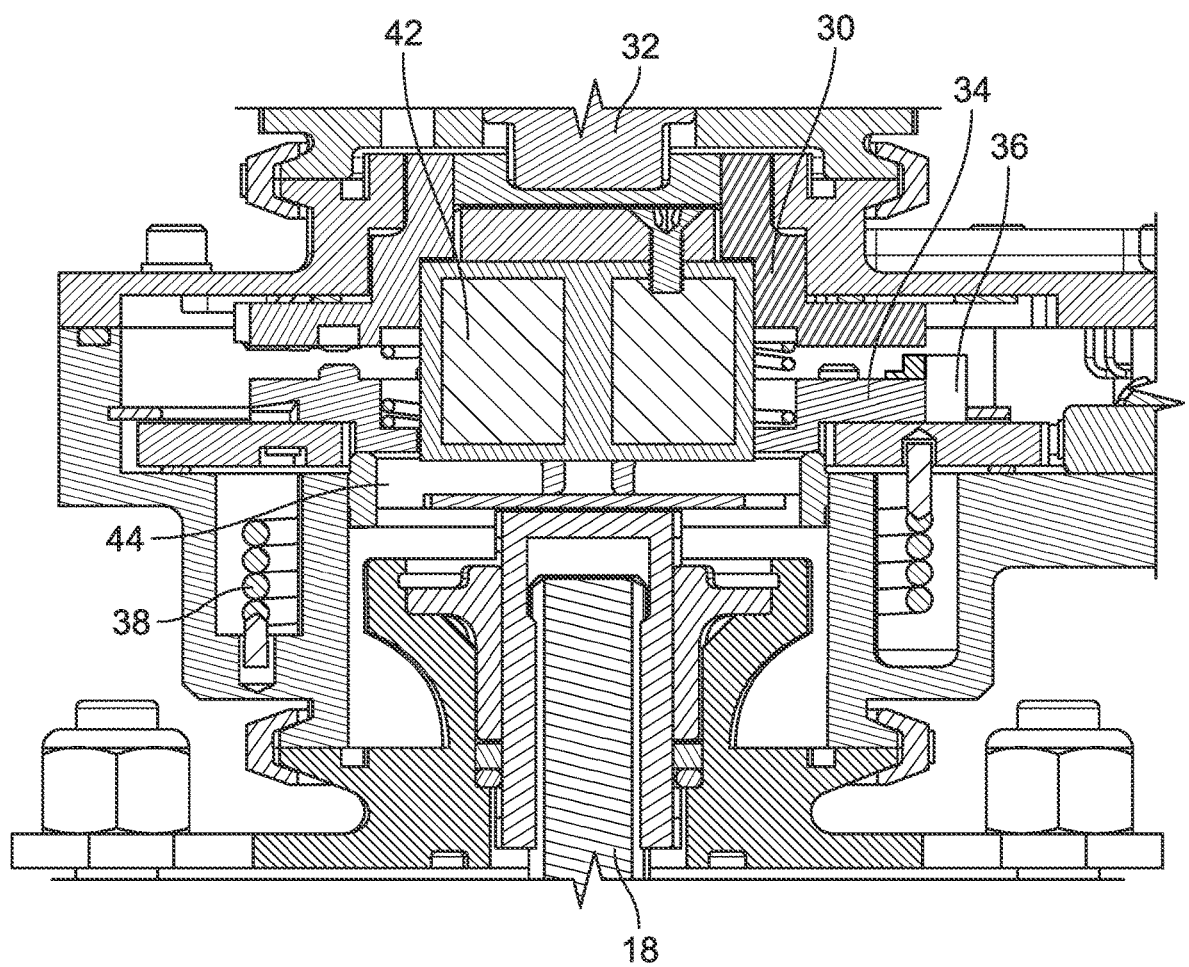
FIG. 25 is a cross-sectional view of a portion of the failsafe valve system of FIG. 1 along line A-A.
Figure 26:
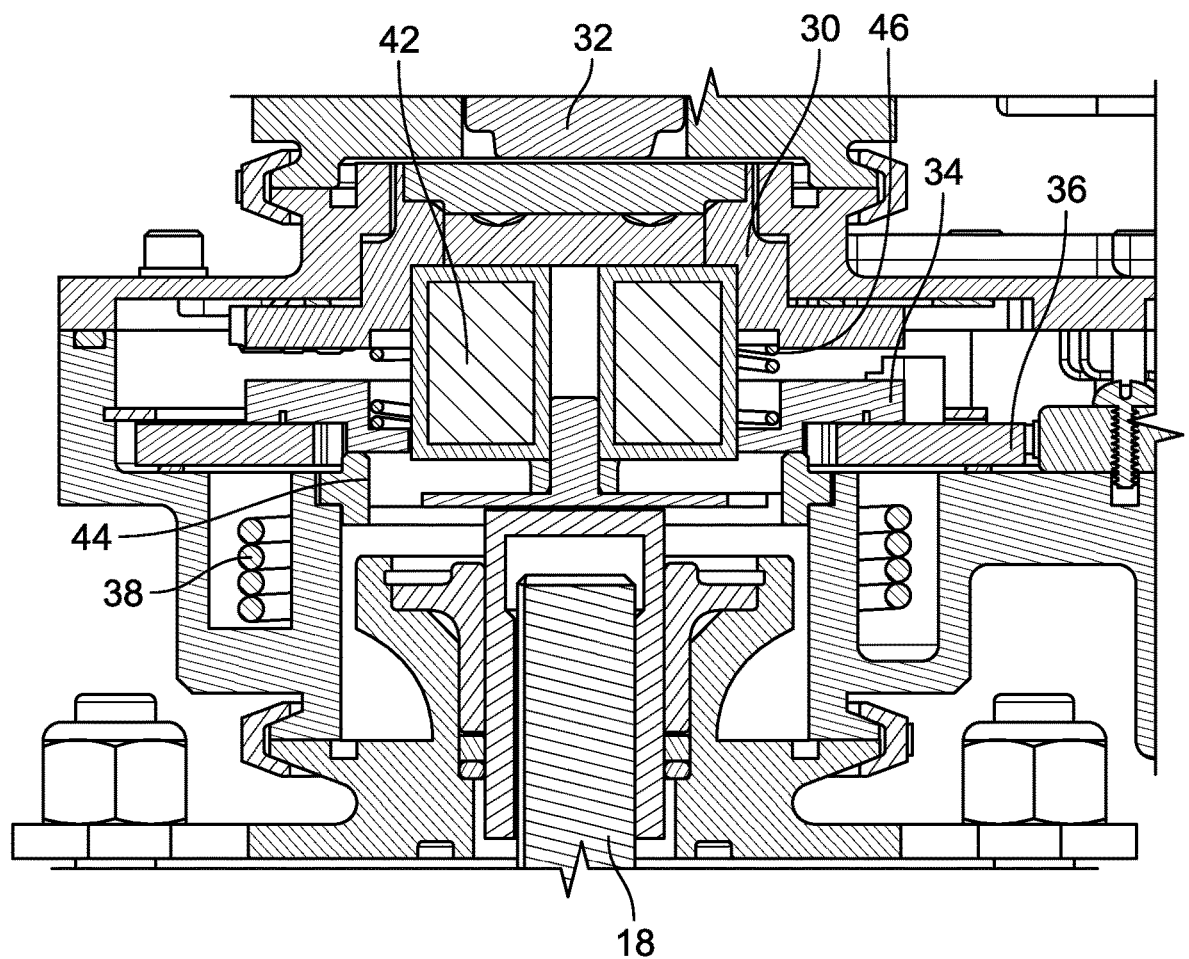
FIG. 26 is a cross-sectional view of a portion of the failsafe valve system of FIG. 1 along line A-A.
Figure 27:
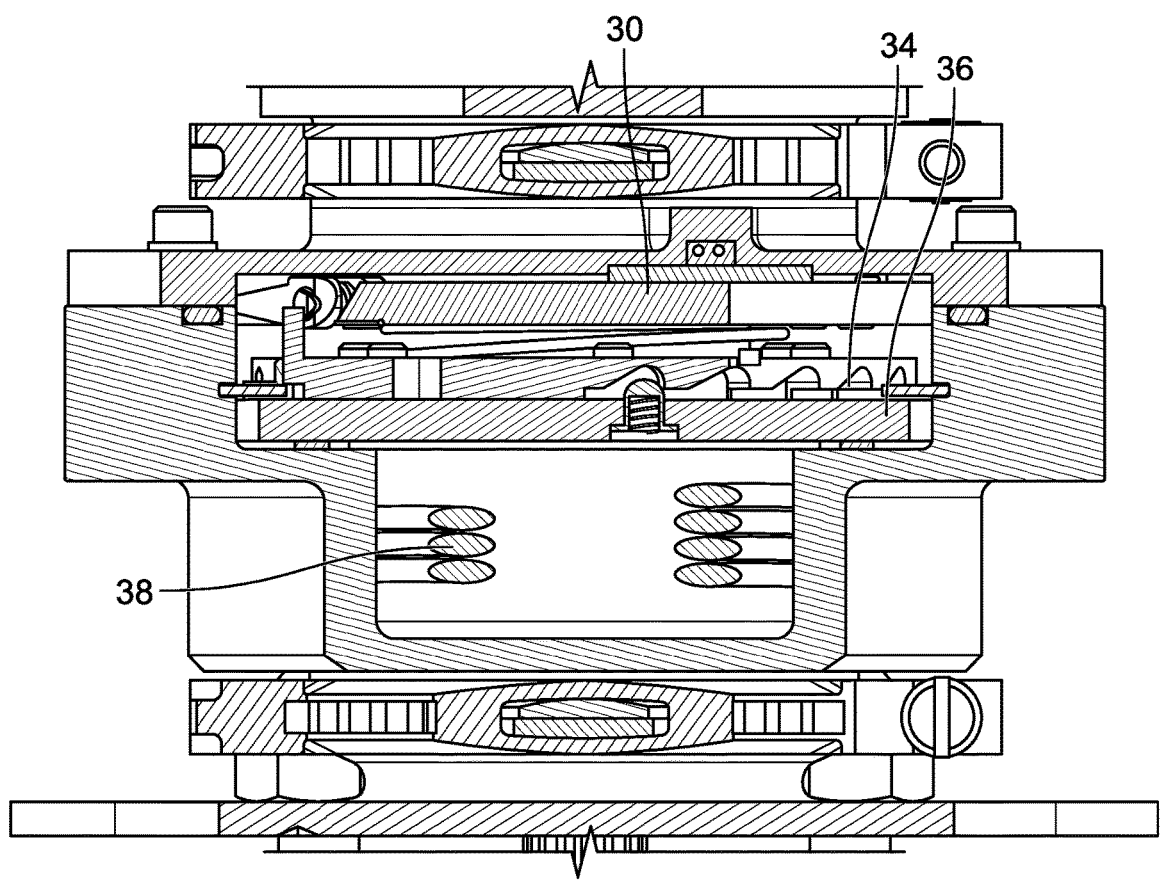
FIG. 27 is a cross-sectional view of a portion of the failsafe valve system of FIG. 1.
Figure 28:
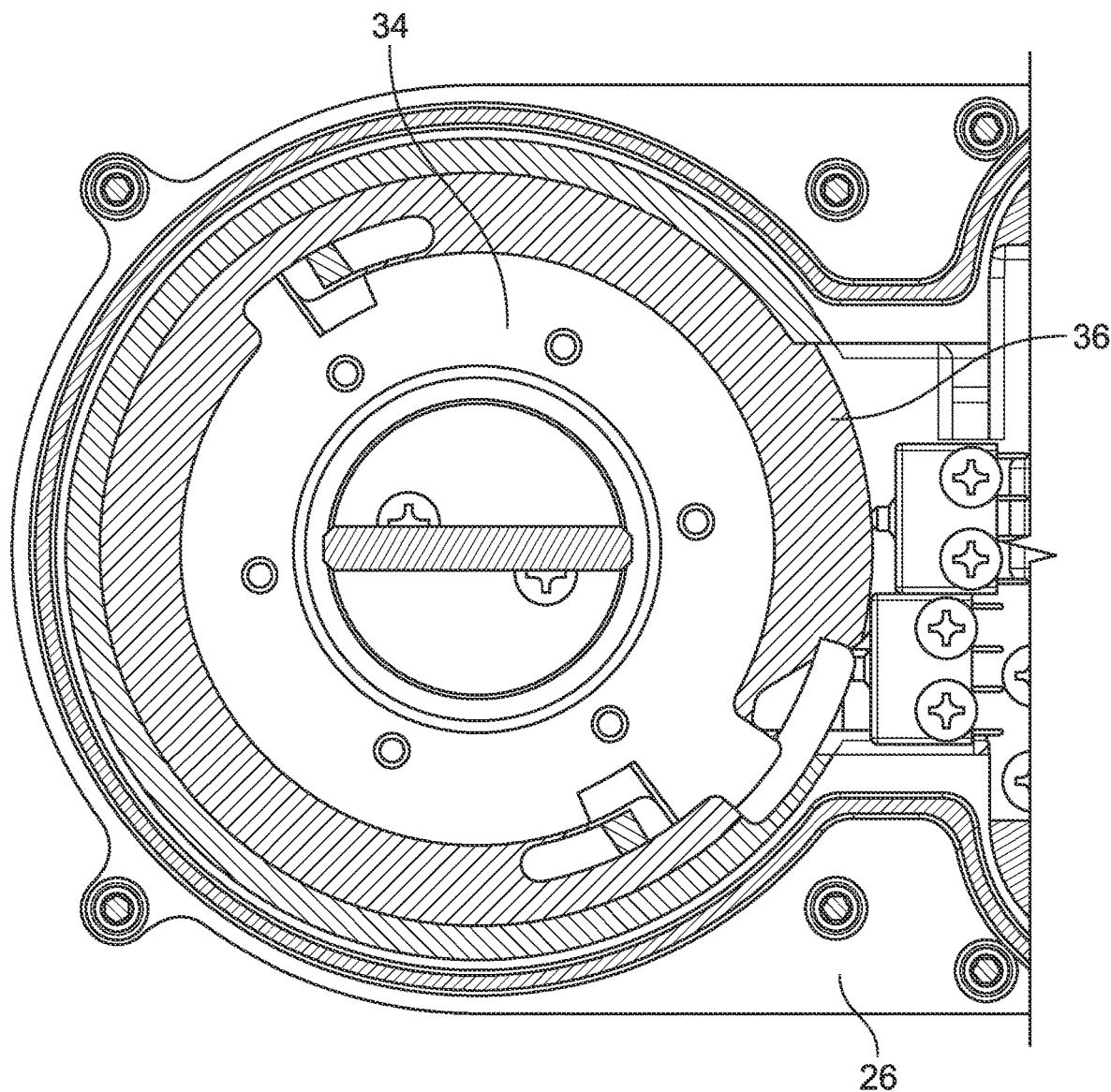
FIG. 28 is a top view of the failsafe valve system with certain parts removed.
Figure 29:
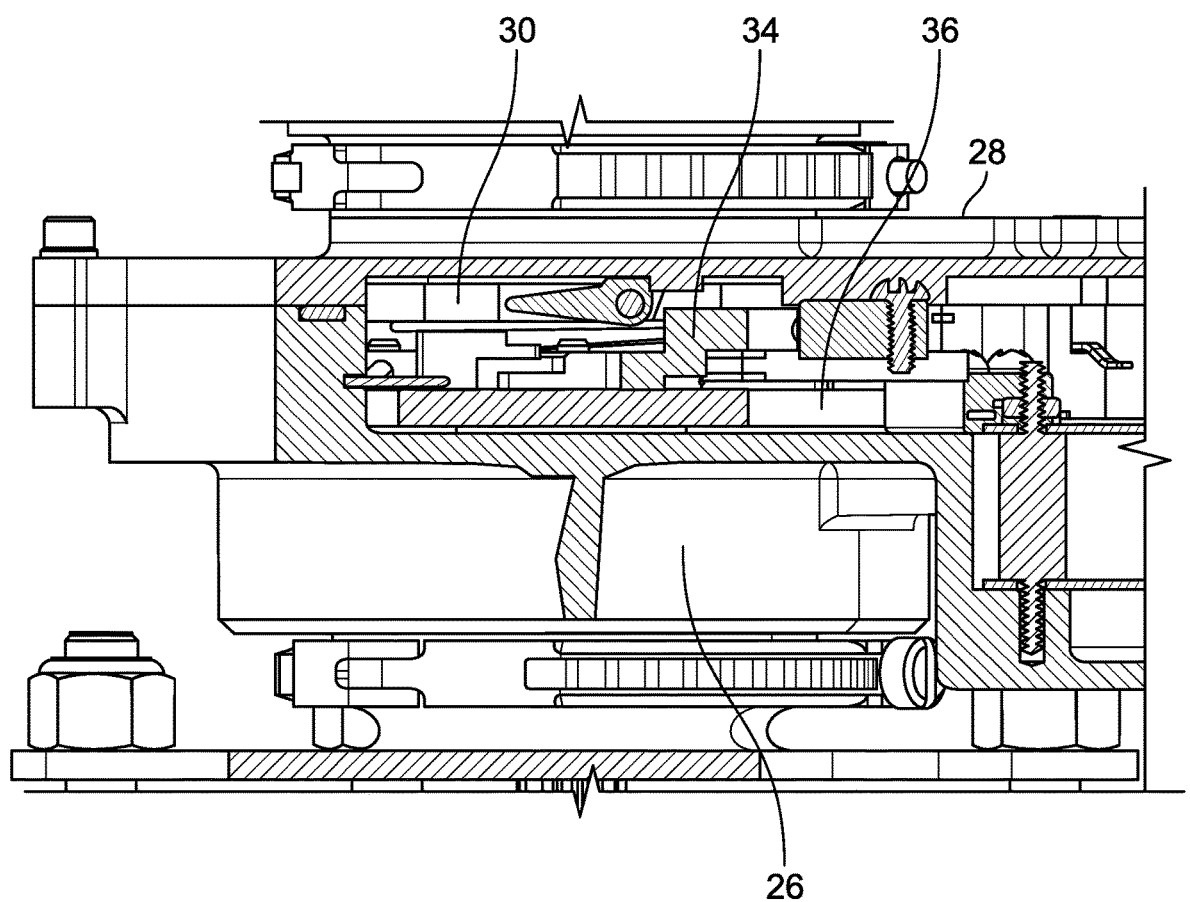
FIG. 29 is a partial cross-sectional view of a portion of the failsafe valve system.
Figure 30:
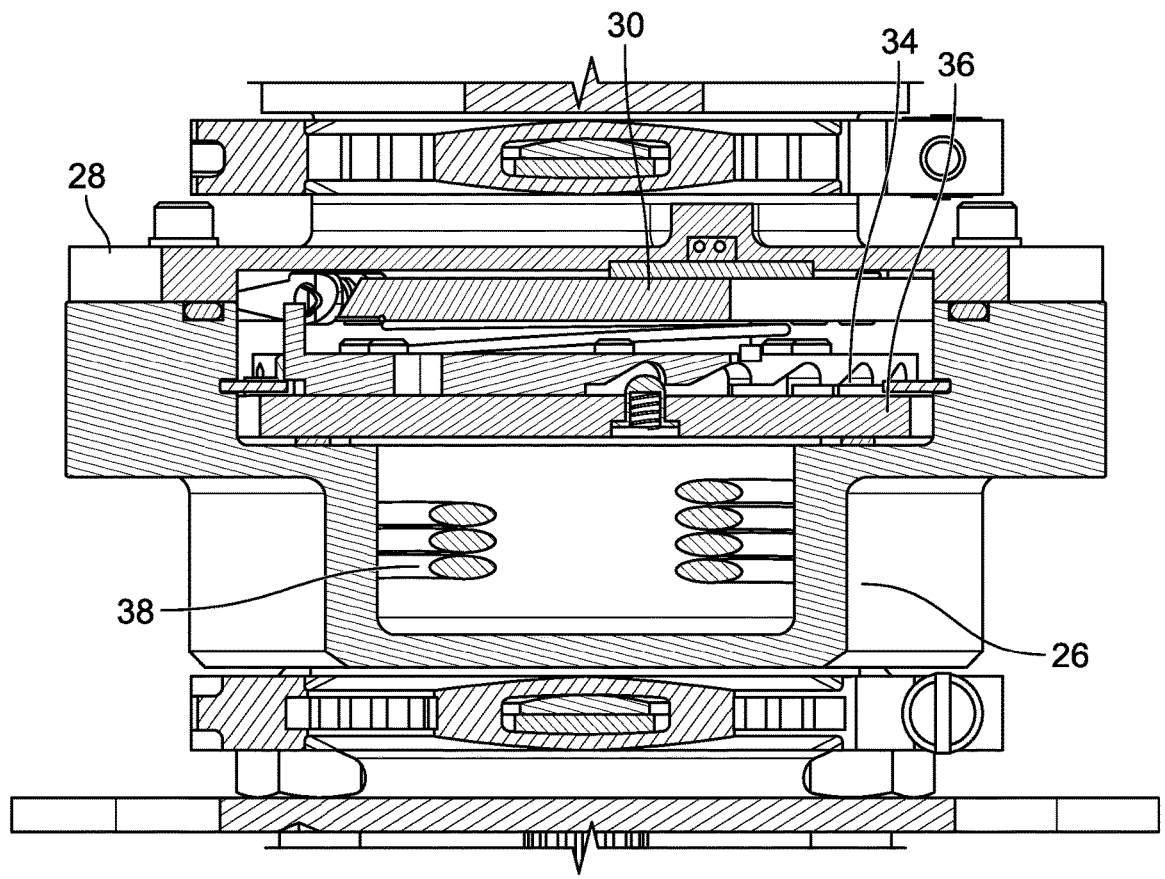
FIG. 30 is a partial cross-sectional view of a portion of the failsafe valve system.
Figure 31:
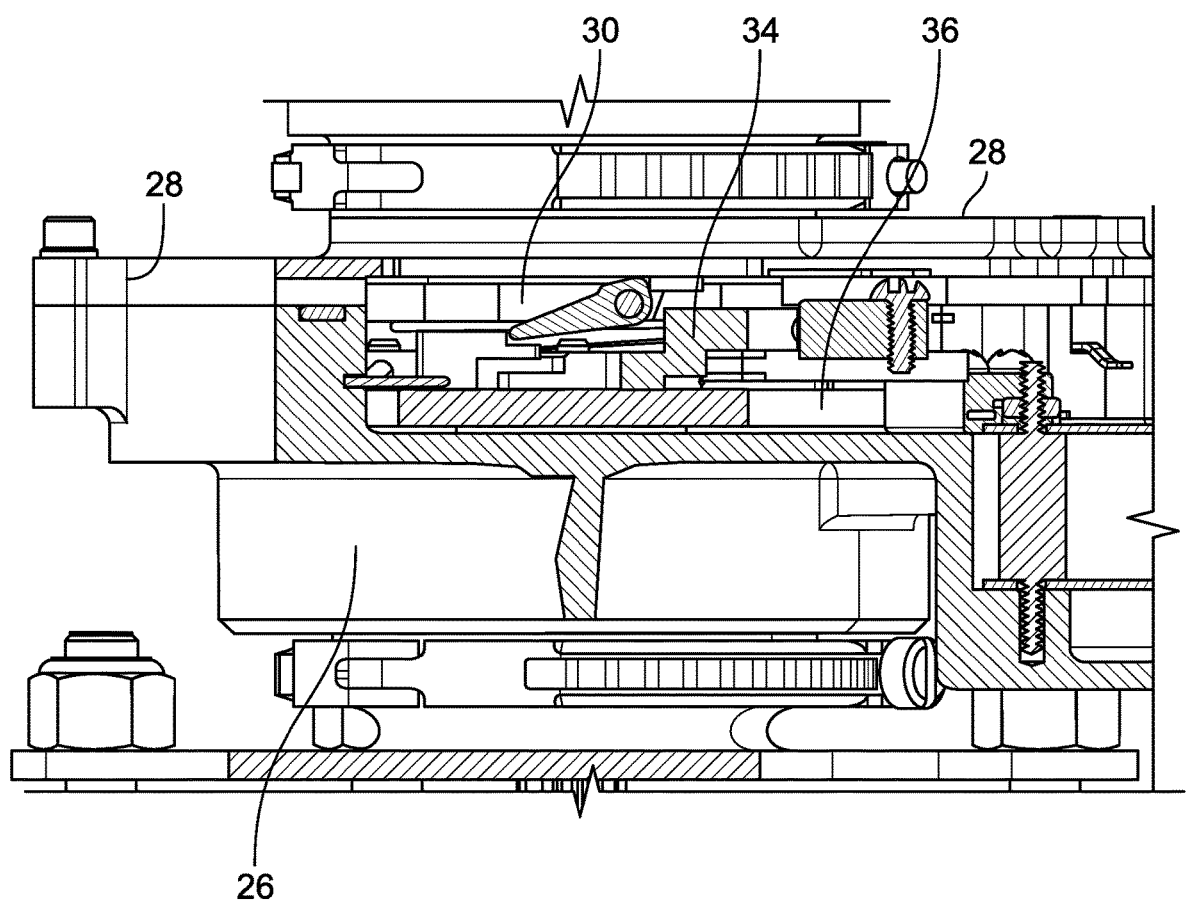
FIG. 31 is a partial cross-sectional view of a portion of the failsafe valve system.
Figure 32:
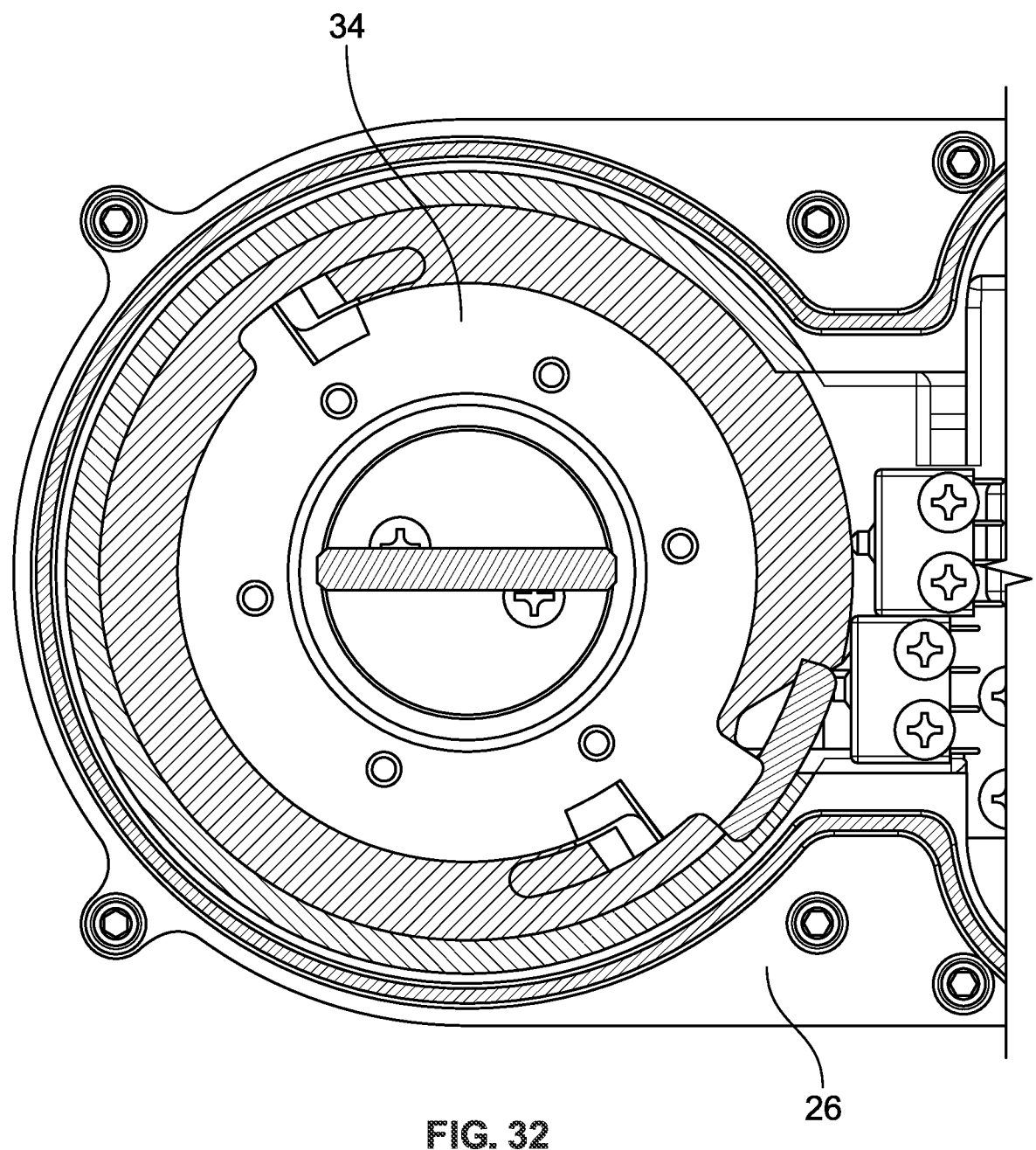
FIG. 32 is a top view of the failsafe valve system with certain parts removed.
Figure 33:
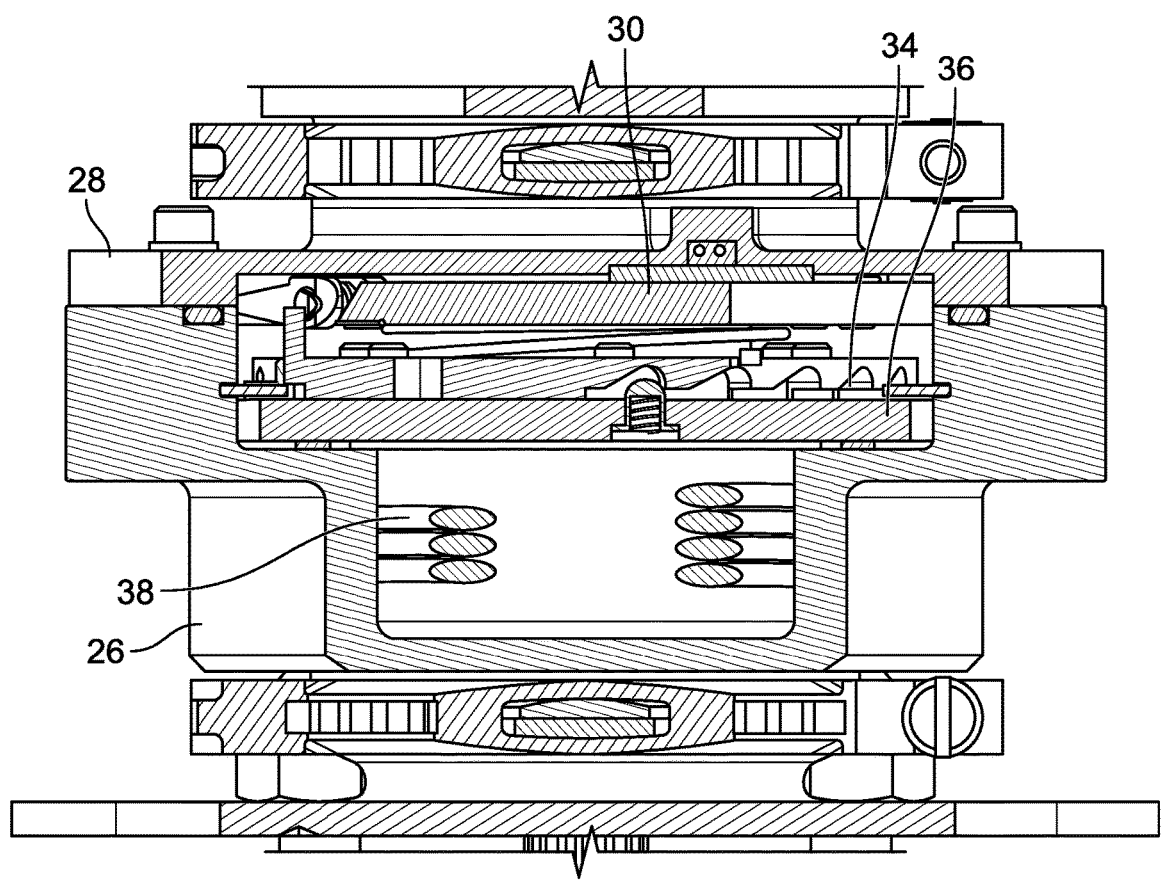
FIG. 33 is a partial cross-sectional view of a portion of the failsafe valve system.
Figure 34:
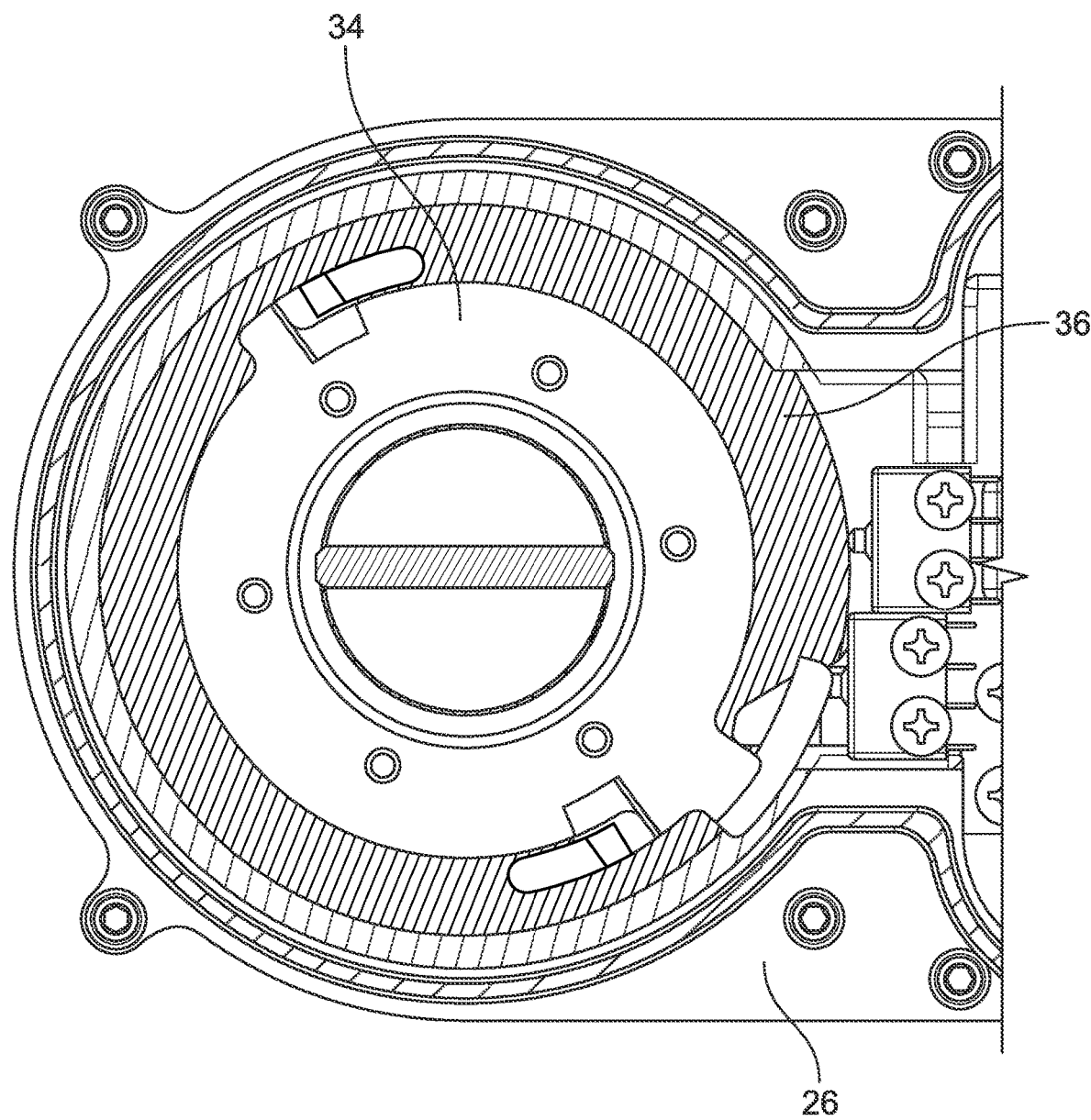
FIG. 34 is a top view of the failsafe valve system with certain parts removed.
Figure 35:
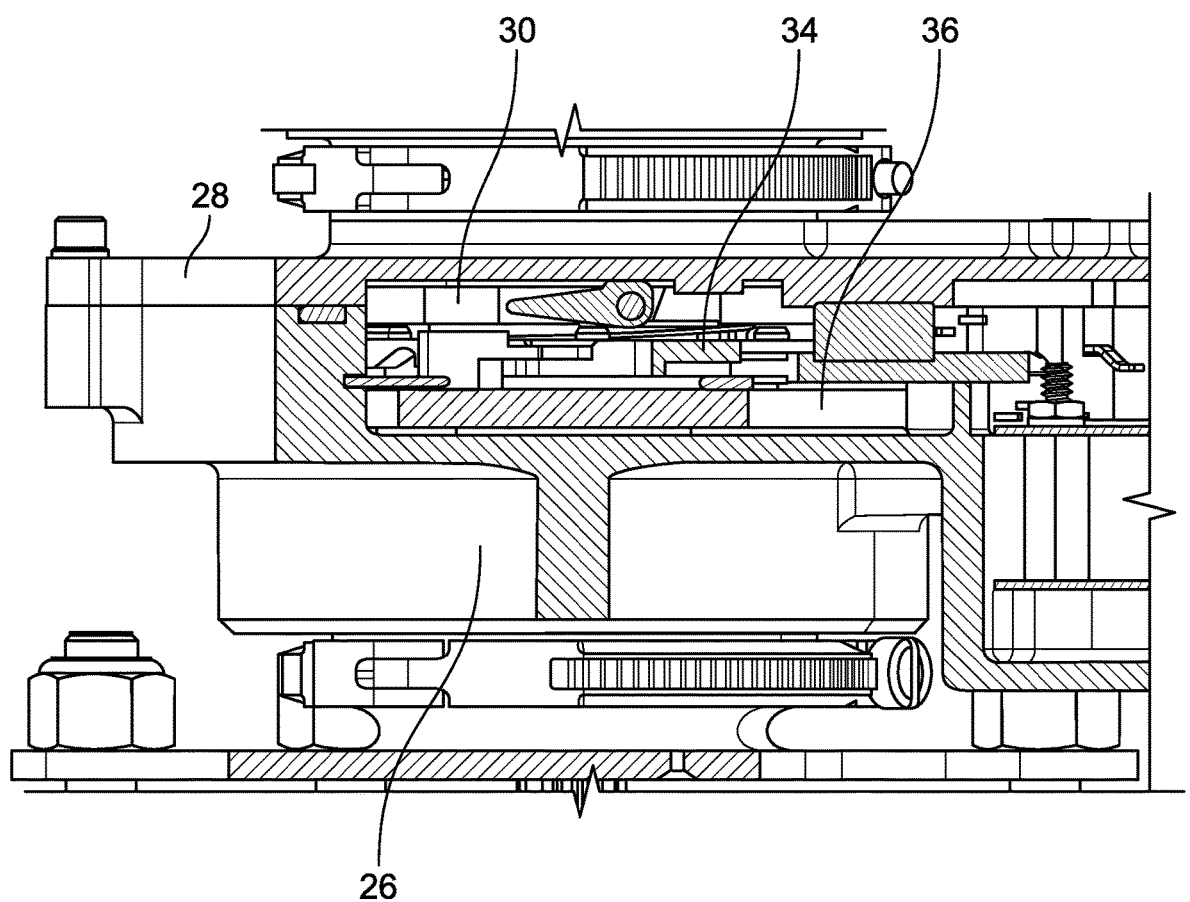
FIG. 35 is a partial cross-sectional view of a portion of the failsafe valve system.
Figure 36:
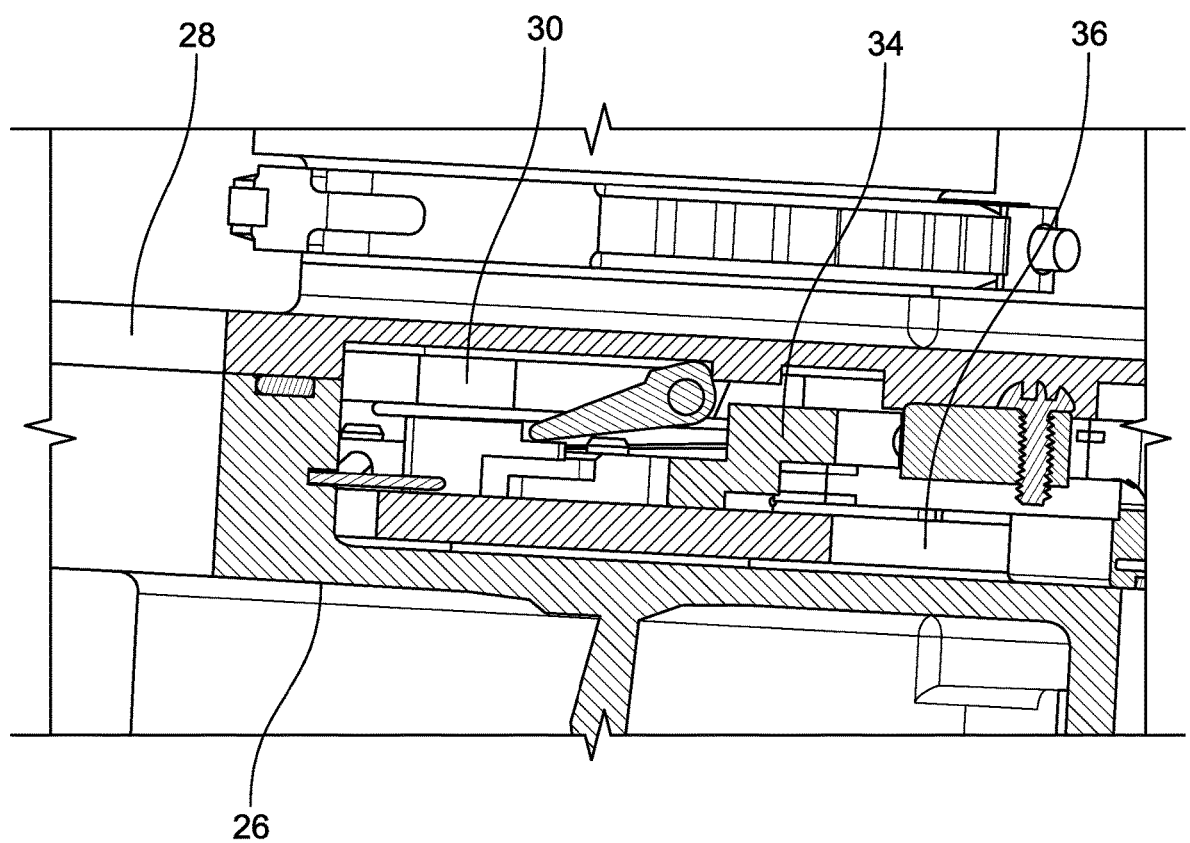
FIG. 36 is a partial cross-sectional view of a portion of the failsafe valve system.
Figure 37:
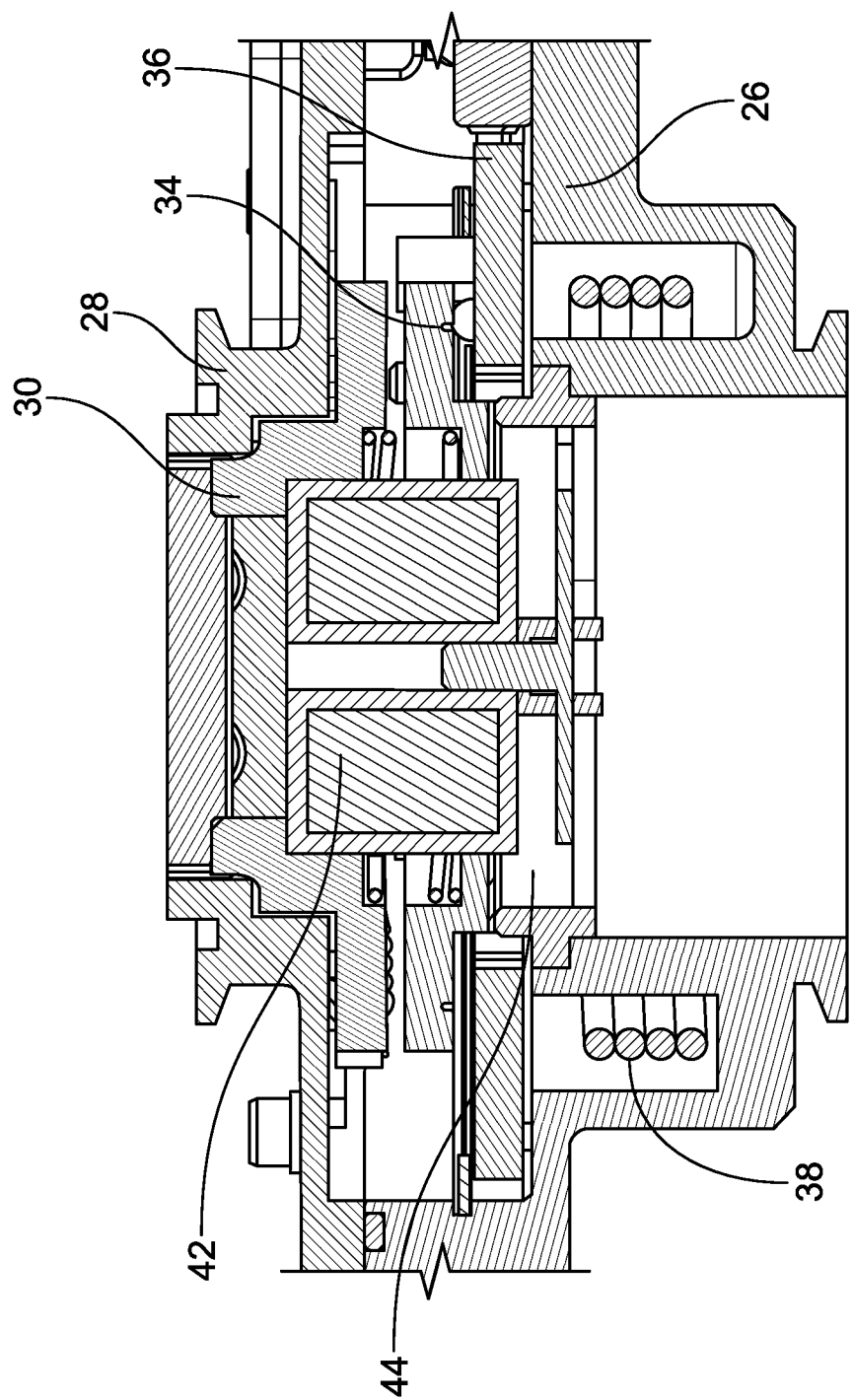
FIG. 37 is a partial cross-sectional view of a portion of the failsafe valve system.
Figure 38:
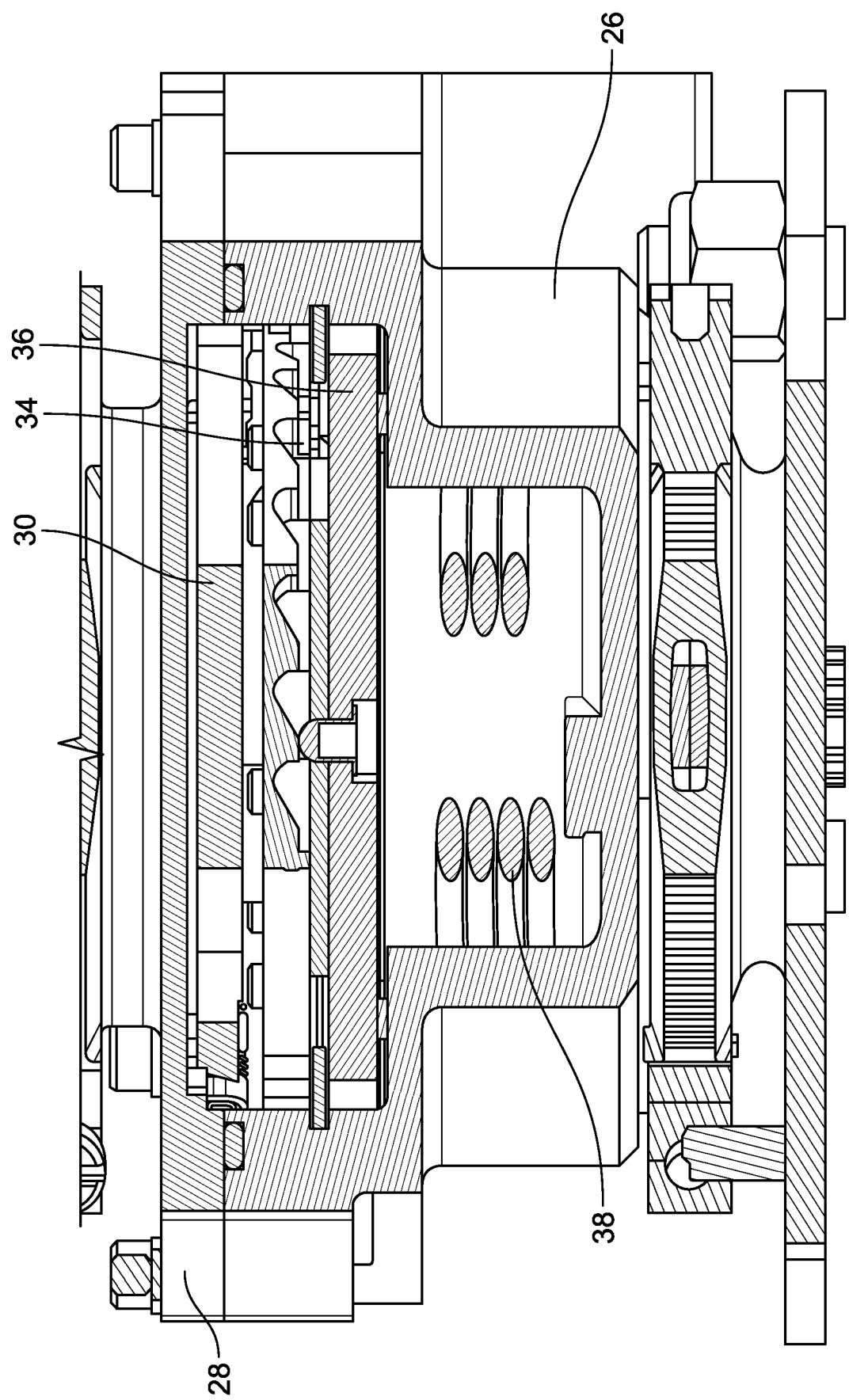
FIG. 38 is a partial cross-sectional view of a portion of the failsafe valve system.
Figure 39:
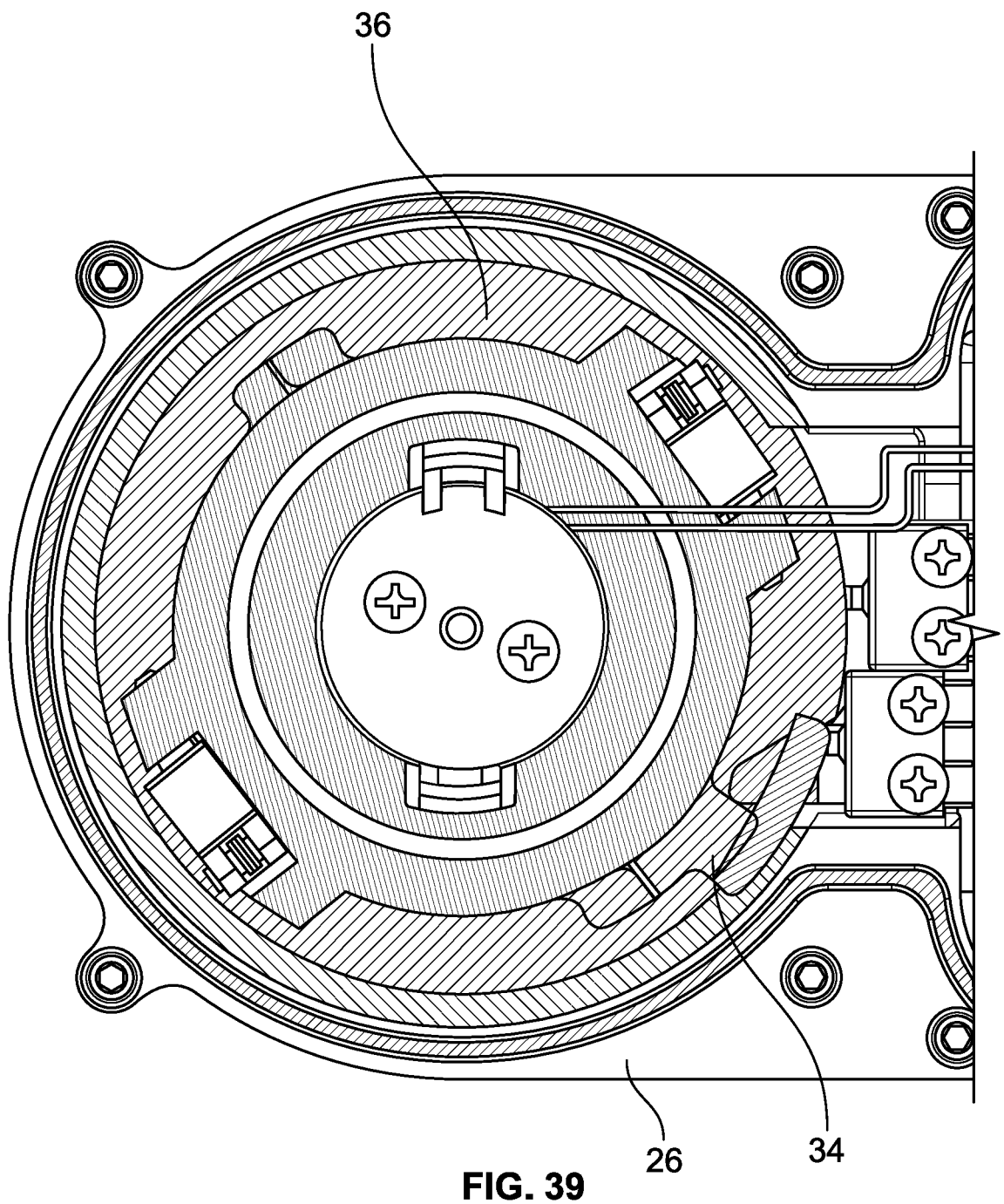
FIG. 39 is a top view of the failsafe valve system with certain parts removed.

Referring to FIGS. 5 and 6, the failsafe drive adapter 14 is described in further detail. In the depicted embodiment, the failsafe drive adapter 14 includes a failsafe drive adapter housing base 26 and a failsafe drive adapter housing cover 28 that mounts to the failsafe drive adapter housing base 26. In the depicted embodiment, the failsafe drive adapter 14 includes an actuator plate 30 which is keyed to the output 32 of the actuator 12 so that they rotate together. In the depicted embodiment, the failsafe drive adapter 14 includes a valve plate 34 which is connected to the input shaft 18 to drive the rotation of the spherical plug 22 of the pedestal ball valve 16. In the depicted embodiment, the spherical plug 22 of the pedestal ball valve 16 rotates together with the valve plate 34.

In the depicted embodiment, the failsafe drive adapter 14 includes a failsafe plate 36 which is connected to a torsional spring 38. The torsional spring 38 stores energy that is required for the driving of the valve 16 when the system is in a failsafe operation. In the depicted embodiment, the failsafe drive adapter 14 includes a retaining ring 40 that keeps the failsafe drive in place and limits its axial motion.

In the depicted embodiment, the failsafe drive adapter 14 includes a solenoid 42 that facilitates the latching and locking based on the mode of operation of the failsafe system. In the depicted embodiment, the failsafe drive adapter 14 includes a solenoid spindle 44 which moves upwards when the solenoid 42 is powered on and latches the valve plate 34 with the actuator plate 30 and also locks the failsafe plate 36 with the failsafe drive adapter housing base 26. In the depicted embodiment, the failsafe drive adapter 14 includes a compression spring 46 that biases the valve plate 34 downward which biases the solenoid spindle 44 downward. The compression spring 46 detaches the failsafe plate 36 from the failsafe drive adapter housing base 26 and unlocks the valve plate 34 from the actuator plate 30 in the event of power loss to the solenoid 42.

In the depicted embodiment, the failsafe drive adapter 14 includes a first position sensor 48 that detects when the valve plate 34 is in a first position (0 degrees) which corresponds to the valve 16 being fully open. In the depicted embodiment, the failsafe drive adapter 14 includes a second position sensor 50 that detects when the failsafe plate 36 is in the stored energy position (90 degrees).

In the depicted embodiment, the failsafe drive adapter 14 includes a controller 52 that is configured to monitor a number of parameters (e.g., power state of the solenoid 42, the position of the valve 16, the position of the failsafe, or the actuator 12 position) and determine the necessary operation. In the depicted embodiment, the failsafe drive adapter 14 includes a first connector 54 for connection to the actuator 12 and a second connector 56 for connection to the overall system (e.g., the aircraft of which the failsafe valve system is a part of).

Referring to FIGS. 7-14, the valve plate 34 is described in further detail. As discussed above, the valve plate 34 connects to the pedestal ball valve 16 to drive the valve 16 to a desired position depending upon the driving element (actuator 12 or failsafe) based on the operating state. In the depicted embodiment, the valve plate 34 has protrusions 60 that mate with the actuator plate 30 mating holes 62 for positive locking of the valve 16 and the actuator 12 during normal operation. In the depicted embodiment, the protrusions 60 are configured to provide smooth engagement as well as self-centering features with mating holes 62 on the actuator plate 30.

In the depicted embodiment, a directional locking ratchet mechanism is provided on the valve plate 34 that mates with the ratchet lock pins 64 in the failsafe plate 36. The ratchet mechanism on the valve plate 34 allows directional connection with the failsafe plate 36.

During the states when the solenoid 42 is not powered on, during the re-latching operation the failsafe plate 36 moves from an open/default(0°) position to a closed/energy stored (90°) position while the valve plate 34 remains at its position of an open/default(0°) position. During re-latching, the failsafe plate 36 can rotate from zero to ninety degrees independently from the valve plate 34.

During the state of power failure, the failsafe plate 36 moves from a closed/energy stored(90°) position to an open/default(0°) position. In this condition, the failsafe plate 36 drives the valve plate 34 to the open/default(0°) position. In this condition, the valve plate 34 moves with the failsafe plate 36 when the failsafe plate 36 is moving from 90° to 0°.

During the solenoid 42 powered on condition (normal operations), the valve plate 34 is lifted up in order to clear the failsafe ratchet lock and the valve plate 34 and failsafe plate 36 do not interact with each other.

In the depicted embodiment, a mechanical feature 66 on the valve default(0°) position rests against a mechanical end stop 68 in a housing to ensure that the valve 16 does not move below default (0°). In the depicted embodiment, the valve plate 34 includes a sensor contact arm 70 that physically contacts a position sensor 48, 50 when the valve plate 34 is rotated into a specific orientation. In the depicted embodiment, the valve plate 34 includes downwardly extending valve interface arms that interlock with the valve drive system so that rotation of the valve plate 34 translates into rotational motion of the pedestal ball valve 16.

In the depicted embodiment, the actuator plate 30 has protrusions 72 that connect with the output 32 of the actuator. In the depicted embodiment, the actuator plate 30 has two latch mechanisms 74, 76 which play a role in the re-latch function of the failsafe drive adapter 14. As discussed above, the bottom side of the actuator plate 30 includes mating holes 62 which mate with the protrusions 60 on the valve plate 34 when the pedestal ball valve 16 is connected to the actuator 12 through operation of the solenoid 42 during normal operation.

In the depicted embodiment, the latch mechanisms 74, 76 on the actuator plate 30 are present for the directional locking with the failsafe plate 36. In the depicted embodiment, when the actuator plate 30 is moving from 90° or any intermediate position to 0° after a power resumption state, the actuator plate 30 is able to move relative to the failsafe plate 36. Similarly, when the failsafe plate 36 is triggered in the event of power interruption, it is able to rotate independently of the actuator plate 30.

In the depicted embodiment, the latch mechanisms 74, 76 have a central pin which connects the latch with the actuator plate 30 and a small weaker torsional spring 38 which tends to pull up the latch mechanisms 74, 76 away from the failsafe plate 36. In the depicted embodiment, the actuator latch mechanisms 74, 76 are designed in such a way that it has protrusions on the top side which mate with the protrusions on the failsafe drive adapter housing base 26 which pushes the latch mechanisms 74, 76 downwards when the actuator 12 is at the 0° default position.

During return to the open state, the latch mechanisms 74, 76 move past the failsafe plate 36 without interacting with it. When the actuator 12 starts moving from an open/default (0°) position to a closed/energy stored(90°) position, the latch mechanisms 74, 76 are locked with the failsafe protrusion to ensure that the motion from the actuator 12 is now transmitted to the failsafe plate 36 which takes the failsafe drive back to the closed/energy stored(90°) position. Once that condition has occurred, while the actuator 12 is commanded to return to the open position, during this motion the latch pins do not interact with the failsafe plate 36 and are pulled up by the torsional spring 38 within the latch mechanism 74, 76.

In the depicted embodiment, the failsafe plate 36 consists of a ratchet lock pin 64 that ensures there is no locked connection between the failsafe plate 36 and the valve plate 34 when the failsafe plate 36 is moving from 0° to 90°, but ensures there is a locked connection between the valve plate 34 with the failsafe plate 36 when the failsafe plate 36 is moving from 90° to 0°. In the depicted embodiment, the failsafe plate 36 includes an end stop 82 that catches the latch mechanisms 74, 76 on the actuator plate 30 for(0°) position to a closed/energy stored(90°) motion during the re-latching sequence. In the depicted embodiment, the failsafe plate 36 has slots 84 for mechanical locking engagement with mating slots 86 of the solenoid spindle 44 when the solenoid 42 is powered. In the depicted embodiment, the failsafe drive adapter housing base 26 also has matching slot profiles 88 as the failsafe plate 36, which are also engaged with the solenoid spindle 44 thus locking the failsafe plate 36 with the failsafe drive adapter housing base 26 and thereby prevents the failsafe plate 36 from rotating. In the depicted embodiment, the failsafe plate 36 has a periphery edge profile 90 to ensure the closed/energy stored(90°) position is detected by the second position sensor 50. In the depicted embodiment, the torsional spring 38 is used as a stored energy device which has one end connected to the failsafe drive adapter housing base 26 and the other end connected to the failsafe plate 36. As the failsafe plate 36 rotates, it torques the torsional spring 38 thereby storing the desired energy for failsafe operation.

In the depicted embodiment, the solenoid spindle 44 is constructed of a magnetic material and is positioned in the center of the solenoid 42. When the solenoid 42 is powered on, the solenoid spindle 44 is pulled up against a compression spring 46. In the depicted embodiment, the solenoid spindle 44 has protrusions which bias the valve plate 34 upwardly into engagement with the actuator plate 30. In the depicted embodiment, the failsafe plate 36 has slots 84 for mechanical locking onto the mating slots 86 of the solenoid spindle 44 when the solenoid 42 is powered. As discussed above, the failsafe drive adapter housing base 26 also has a matching slot profile 88. In the depicted embodiment, the failsafe plate 36 is engaged with the solenoid spindle 44 thus locking the failsafe plate 36 with the failsafe drive adapter housing base 26 and preventing the failsafe plate 36 from rotating.

EXAMPLE ASPECTS OF THE DISCLOSURE

Aspect 1. A failsafe valve comprising:
   a valve assembly including an input shaft that rotates to control fluid flow through the valve;
   an actuator that rotates the input shaft;
   a failsafe drive adapter that interfaces between the actuator and the input shaft;
   wherein the failsafe drive adapter is configured to drive the rotation of the input shaft in a failsafe state to a predetermined fluid flow state;
   wherein the failsafe drive adapter is configured such that it does not require electrical power to function; and
   wherein the failsafe drive adapter is in a dormant state when the actuator receives electrical power; and
   wherein the failsafe drive adapter automatically activates in the event of a power failure to the actuator.
Aspect 2. The failsafe valve of aspect 1, including a controller and at least one sensor, wherein the controller is configured to activate the failsafe drive adapter based in part on sensed data.
Aspect 3. The failsafe valve of aspect 1, wherein the failsafe drive adapter includes a solenoid, wherein the failsafe drive adapter is automatically engaged when a solenoid is de-energized.
Aspect 4. The failsafe valve of aspect 3, wherein the solenoid when energized maintains preload on a spring and once the solenoid is de-energized, the spring releases its energy which decouples the actuator from the input shaft of the valve and engages the drive assembly of the failsafe drive adapter with the input shaft of the valve.
Aspect 5. The failsafe valve of aspect 1, wherein a loaded torsion spring provides rotational energy needed to drive the valve to a predetermined fluid flow state.
Aspect 6. The failsafe valve of aspect 1, wherein the failsafe drive adapter includes an actuator plate that is coupled to the actuator output, a valve plate that is coupled to the input shaft of the valve, and a failsafe drive assembly that is selectively coupled to the valve plate.
Aspect 7. The failsafe valve of aspect 6, wherein the actuator plate includes pivoting latches, the actuator plate includes at least one pivoting latch that is configured to selectively engage a failsafe plate to drive the failsafe plate and preload the torsion spring.
Aspect 8. The failsafe valve of aspect 6, wherein the valve plate includes a directional locking ratchet that is configured to selectively engage at least one ratchet locking mechanism of the failsafe plate to limit relative rotation between the valve plate and the failsafe plate in a first direction when engaged.
Aspect 9. The failsafe valve of aspect 6, wherein the failsafe drive adapter includes a solenoid and a solenoid spindle connected to the solenoid, the solenoid spindle including an annular collar portion that is configured to drive the valve plate axially and maintain the axial position of the valve plate when the solenoid is energized, and radially extending tabs that engage with the failsafe plate to limit the rotation of the failsafe plate when engaged.
Aspect 10. A failsafe drive adapter for a valve, the failsafe drive adapter configured to selectively decouple an actuator from an input shaft of a valve and engage a drive assembly of the failsafe drive adapter with the input shaft of the valve, the failsafe drive adapter comprising:
   a control system, the control system configured to activate the failsafe drive adapter in the event of a power failure; and
   a torsion spring configured to provide the rotational energy needed to drive the valve in a failsafe mode;
   wherein the failsafe drive adapter is configured to automatically preload the torsion spring.
Aspect 11. The failsafe drive adapter of aspect 10, wherein the drive assembly includes an actuator plate that is coupled to the actuator output, and a valve plate that is coupled to the input shaft of the valve.
Aspect 12. The failsafe drive adapter of aspect 10, wherein the valve plate includes a directional locking ratchet that is configured to engage at least one ratchet locking mechanism of the failsafe plate in a failsafe mode of operation to limit relative rotation between the valve plate and the failsafe plate in a first direction when engaged.
Aspect 13. The failsafe drive adapter of aspect 10, wherein the failsafe drive adapter includes a solenoid and a solenoid spindle connected to the solenoid, the solenoid spindle including an annular collar portion that is configured to drive the valve plate axially and maintain the axial position of the valve plate when the solenoid is energized, and radially extending tabs that engage with the failsafe plate to limit the rotation of the failsafe plate when engaged.
Aspect 14. A failsafe valve comprising:
   a pedestal ball valve, the pedestal ball valve including:
      a pedestal including a first end and a second end;
      a ball valve housing mounted to the second end of the pedestal;
      a plug rotatably mounted in the ball valve housing; and
      an input shaft that extends through the pedestal that is configured to rotate the plug;
   an actuator that is configured to drive the pedestal ball valve between a closed position to an open position, the actuator including an actuator output drive;
   a failsafe drive adapter mounted to the first end of the pedestal, the failsafe drive adapter including:
      a failsafe drive adapter housing including a base portion;
      a failsafe drive adapter housing cover connected to the base portion;
      an actuator plate located within the housing, the actuator plate being mated with the actuator output drive such that the actuator plate rotates with the output drive of the actuator;
      a valve plate located within the housing, the valve plate being mated with the input shaft of the pedestal ball valve such that the valve plate rotates with the input shaft;
      wherein the actuator plate and the valve plate are selectively engaged such that in a first state they rotate together and in a second state they can rotate independent of each other; and
      a failsafe plate located within the housing, the failsafe plate being spring loaded to rotate and drive the valve plate in the event of an actuator failure, the failsafe plate being selectively engaged and disengaged with the valve plate.
Aspect 15. The failsafe valve of aspect 14, wherein the failsafe drive adapter further comprises:

a solenoid that is normally activated when the solenoid is energized;

a spindle that is engaged with the solenoid and secured in a first axial position when the solenoid is activated, wherein when the spindle is in the first axial position the failsafe plate is locked to the housing, the failsafe plate is disengaged from the valve plate, and the valve plate is locked to the actuator plate, wherein when the spindle axially translates to a second axial position when the solenoid is deactivated and wherein when the spindle is in the second axial position, the failsafe plate is unlocked from the housing, the failsafe plate is engaged with the valve plate, and the valve plate is unlocked from the actuator plate.

Aspect 16. The failsafe valve of aspect 14, wherein the failsafe drive adapter includes a torsional spring that is anchored to the failsafe drive adapter housing and is configured to store energy and provide a driving force to rotate the failsafe plate in the failsafe mode.

Aspect 17. The failsafe valve of aspect 14, wherein the failsafe drive adapter includes a control system that includes:

a first position sensor that monitors the rotational position of the valve plate;

a second position sensor that monitors the rotational position of the failsafe plate; and a controller configured to determine whether the failsafe plate requires resetting.

Aspect 18. A method of providing failsafe protection to an actuated valve, the method comprising the steps of:

providing a failsafe that activates automatically upon loss of electrical power; and providing a failsafe that engages when a solenoid is de-energized thereby allowing a spring to disengage the actuator from a ball screw drive train and for a torsional spring loaded failsafe drive plate to engage the ball screw drive train and override the driving of the ball screw and to bias the ball screw into a predetermined desired failsafe position.

Those skilled in the art will readily recognize various modifications and changes that may be made without following the example embodiments and application illustrated and described herein, and without departing from the true spirit and scope of the following claims.

What is claimed is:

1. A failsafe drive adapter for providing failsafe capabilities to an actuator and a valve assembly, the failsafe drive adapter comprising:

a failsafe drive adapter housing base;

a failsafe drive adapter cover mounted to the failsafe drive adapter housing base;

the failsafe drive adapter cover having a first connection interface for engaging with a housing of the actuator;

the failsafe drive adapter housing base having a second connection interface for engaging with a housing of the valve assembly;

an actuator plate located within the failsafe drive adapter housing base, the actuator plate defining a first interface configured to be coupled to an actuator output of the actuator;

a valve plate located within the failsafe drive adapter housing base, the valve plate defining a second interface configured to be coupled to an input shaft of the valve assembly; and a failsafe plate located adjacent the valve plate, the failsafe plate comprising ratchet lock pins that engage the valve plate to move the valve plate to an open position in the event of a power failure to the actuator, and the valve plate located between the actuator plate and the failsafe plate;

wherein the failsafe drive adapter is configured to drive the rotation of the input shaft in a failsafe state to a predetermined fluid flow state;

wherein the failsafe drive adapter is configured such that it does not require electrical power to function;

wherein the failsafe drive adapter is in a dormant state when the actuator receives electrical power; and wherein the failsafe drive adapter automatically activates in the event of a power failure to the actuator.

2. The failsafe drive adapter of claim 1, further comprising a controller and at least one sensor, wherein the controller is configured to activate the failsafe drive adapter based in part on sensed data.

3. The failsafe drive adapter of claim 1, wherein the failsafe drive adapter includes a solenoid, wherein the failsafe drive adapter is automatically engaged when the solenoid is de-energized.

4. The failsafe drive adapter of claim 3, wherein the solenoid when energized maintains preload on a loaded torsion spring and once the solenoid is de-energized, the loaded torsion spring releases its energy which decouples the actuator from the input shaft of the valve assembly and engages a drive assembly of the failsafe drive adapter with the input shaft of the valve assembly.

5. The failsafe drive adapter of claim 4, wherein the loaded torsion spring provides rotational energy needed to drive the valve assembly to the predetermined fluid flow state.

6. The failsafe drive adapter of claim 4, wherein the actuator plate includes at least one pivoting latch that is configured to selectively engage the failsafe plate to drive the failsafe plate and preload the torsion spring.

7. The failsafe drive adapter of claim 6, wherein the failsafe drive adapter includes a solenoid spindle connected to the solenoid, the solenoid spindle including an annular collar portion that is configured to drive the valve plate axially and maintain the axial position of the valve plate when the solenoid is energized, and radially extending tabs that engage with the failsafe plate to limit the rotation of the failsafe plate when engaged.

8. The failsafe drive adapter of claim 1, wherein the actuator plate and the valve plate are selectively engaged such that in a first state, they rotate together and in a second state, they can rotate independent of each other; and the failsafe plate being spring loaded to rotate and drive the valve plate in the event of an actuator failure, the failsafe plate being selectively engaged and disengaged with the valve plate.

9. A failsafe valve assembly comprising:

the failsafe drive adapter of claim 1;

the actuator that rotates the input shaft; and the valve assembly.

10. A failsafe drive adapter comprising:

a failsafe drive adapter housing base;

a failsafe drive adapter cover mounted to the failsafe drive adapter housing base;

an actuator plate located within the failsafe drive adapter housing base, the actuator plate defining a first interface configured to be coupled to an actuator output of an actuator, wherein the actuator plate includes at least one pivoting latch that is configured to selectively engage a failsafe plate to drive the failsafe plate and preload a torsion spring;

a valve plate located within the failsafe drive adapter housing base, the valve plate defining a second interface configured to be coupled to an input shaft of a valve assembly;
a solenoid, wherein the failsafe drive adapter is automatically engaged when the solenoid is de-energized, and the solenoid maintains preload on the loaded torsion spring when energized and once the solenoid is de-energized, the loaded torsion spring releases its energy which decouples the actuator from the input shaft of the valve assembly and engages a drive assembly of the failsafe drive adapter with the input shaft of the valve assembly; and
a solenoid spindle connected to the solenoid, the solenoid spindle including an annular collar portion that is configured to drive the valve plate axially and maintain the axial position of the valve plate when the solenoid is energized, and radially extending tabs that engage with the failsafe plate to limit the rotation of the failsafe plate when engaged;
wherein the failsafe drive adapter is configured to drive the rotation of the input shaft in a failsafe state to a predetermined fluid flow state,
wherein the failsafe drive adapter is configured such that it does not require electrical power to function,
wherein the failsafe drive adapter is in a dormant state when the actuator receives electrical power, and
wherein the failsafe drive adapter automatically activates in the event of a power failure to the actuator.

11. A failsafe drive adapter comprising:
a failsafe drive adapter housing base;
a failsafe drive adapter cover mounted to the failsafe drive adapter housing base;
an actuator plate located within the failsafe drive adapter housing base, the actuator plate defining a first interface configured to be coupled to an actuator output of an actuator;
a valve plate located within the failsafe drive adapter housing base, the valve plate defining a second interface configured to be coupled to an input shaft of a valve assembly;
a solenoid, wherein the failsafe drive adapter is automatically engaged when the solenoid is de-energized, and the solenoid maintains preload on a loaded torsion spring when energized and once the solenoid is de-energized, the loaded torsion spring releases its energy which decouples the actuator from the input shaft of the valve assembly and engages a drive assembly of the failsafe drive adapter with the input shaft of the valve assembly; and
a solenoid spindle connected to the solenoid, the solenoid spindle including an annular collar portion that is configured to drive the valve plate axially and maintain the axial position of the valve plate when the solenoid is energized, and radially extending tabs that engage with the failsafe plate to limit the rotation of the failsafe plate when engaged,
wherein the failsafe drive adapter is configured to drive rotation of the input shaft in a failsafe state to a predetermined fluid flow state,
wherein the failsafe drive adapter is configured such that it does not require electrical power to function,
wherein the failsafe drive adapter is in a dormant state when the actuator receives electrical power, and
wherein the failsafe drive adapter automatically activates in the event of a power failure to the actuator.

\* \* \* \* \*